(12) United States Patent
Berg et al.

(10) Patent No.: US 8,346,860 B2
(45) Date of Patent: Jan. 1, 2013

(54) MULTI-PHASED AND PARTITIONED CONTENT PREPARATION AND DELIVERY

(75) Inventors: Johannes Berg, Vasa (FI); Marcus Wikars, Vasa (FI); Magnus Holtlund, Vasa (FI)

(73) Assignee: Lumi Technologies Limited, London (GB)

( * ) Notice: Subject to any disclaimer, the term of this patent is extended or adjusted under 35 U.S.C. 154(b) by 0 days.

(21) Appl. No.: 13/269,241

(22) Filed: Oct. 7, 2011

(65) Prior Publication Data
US 2012/0089668 A1 Apr. 12, 2012

Related U.S. Application Data

(60) Provisional application No. 61/391,272, filed on Oct. 8, 2010.

(51) Int. Cl.
*G06F 15/16* (2006.01)
(52) U.S. Cl. .................................. 709/203
(58) Field of Classification Search ............ 709/203
See application file for complete search history.

(56) References Cited

U.S. PATENT DOCUMENTS

| | | | |
|---|---|---|---|
| 6,191,821 B1 | 2/2001 | Kupnicki | |
| 6,745,011 B1 | 6/2004 | Hendrickson et al. | |
| 6,754,470 B2 | 6/2004 | Hendrickson et al. | |
| 7,408,502 B2 | 8/2008 | Percy et al. | |
| 7,516,204 B2 | 4/2009 | Kobayashi | |
| 7,523,191 B1 | 4/2009 | Thomas et al. | |
| 7,817,983 B2 | 10/2010 | Cassett et al. | |
| 7,873,353 B2 | 1/2011 | Kloba et al. | |
| 7,877,518 B2 * | 1/2011 | Liu | 709/248 |
| 2005/0239551 A1 | 10/2005 | Griswold et al. | |
| 2005/0243784 A1 | 11/2005 | Fitzgerald et al. | |
| 2007/0220494 A1 | 9/2007 | Spooner | |
| 2007/0260475 A1 | 11/2007 | Bhanote | |
| 2007/0288662 A1 | 12/2007 | Chen | |
| 2008/0016176 A1 | 1/2008 | Leitner | |
| 2008/0059300 A1 | 3/2008 | Hamoui | |
| 2008/0098062 A1 | 4/2008 | Balia | |
| 2008/0195691 A1 | 8/2008 | Kloba et al. | |
| 2008/0215672 A1 | 9/2008 | Kloba et al. | |

(Continued)

FOREIGN PATENT DOCUMENTS
WO WO 03/021463 3/2003

(Continued)

OTHER PUBLICATIONS

Compton, Georgina, "Search and Advisory Service Search Report—Sponsor Ref.: 45011; SAS Ref.: S1226401; Applicant: Apollo Mobile Ltd.", Jan. 20, 2011, 6 pages, Search and Advisory Service Intellectual Property Office, Newport, South Wales.

(Continued)

*Primary Examiner* — Ryan Jakovac
(74) *Attorney, Agent, or Firm* — Brown Rudnick LLP

(57) ABSTRACT

The invention generally relates to optimizing the speed and reliability of the delivery of content or functionality to electronic devices. In certain aspects, the invention provides a system for managing content including a production server with a web interface and configured to allow a producer to create content. The system includes a gateway server which can receive the content and write it to a dynamic section. The gateway server can then compile the dynamic section into a compiled section, still including the content, and send it to a client, thereby giving an end-user access to new content or functionality.

8 Claims, 5 Drawing Sheets

U.S. PATENT DOCUMENTS

| | | | |
|---|---|---|---|
| 2009/0005002 A1 | 1/2009 | Agarwal | |
| 2009/0119375 A1 | 5/2009 | Shenfield | |
| 2009/0150872 A1* | 6/2009 | Russell et al. | 717/140 |
| 2009/0157792 A1 | 6/2009 | Fiatal | |
| 2009/0167553 A1 | 7/2009 | Hong et al. | |
| 2009/0203352 A1 | 8/2009 | Fordon et al. | |
| 2009/0254851 A1 | 10/2009 | Scott et al. | |
| 2009/0271267 A1 | 10/2009 | Moukas et al. | |
| 2009/0282127 A1 | 11/2009 | Leblanc | |
| 2009/0300143 A1 | 12/2009 | Musa et al. | |
| 2010/0100445 A1 | 4/2010 | Flood et al. | |
| 2010/0115047 A1 | 5/2010 | Briscoe | |
| 2010/0121744 A1 | 5/2010 | Belz et al. | |
| 2010/0146133 A1 | 6/2010 | Perrin et al. | |
| 2010/0284380 A1 | 11/2010 | Banerjee | |
| 2012/0173986 A1 | 7/2012 | Jung | |

FOREIGN PATENT DOCUMENTS

| | | |
|---|---|---|
| WO | WO 2006/099586 | 9/2006 |
| WO | WO 2008/042923 | 4/2008 |
| WO | WO 2008091101 A1 * | 7/2008 |
| WO | 2009079794 | 7/2009 |

OTHER PUBLICATIONS

International Search Report and Written Opinion in International Patent Application PCT/US2011/055426, mailed Mar. 22, 2012 (8 pages).

International Search Report and Written Opinion for PCT/US2011/055440, May 31, 2012 (9 pages).

International Search Report and Written Opinion for PCT/US2011/055433, Jun. 1, 2012 (8 pages).

* cited by examiner

MULTI-PHASED AND PARTITIONED CONTENT PREPARATION AND DELIVERY

RELATED APPLICATION

This is application claims priority to U.S. Provisional 61/391,272, filed Oct. 8, 2010, which is herein incorporated by reference in its entirety.

FIELD OF THE INVENTION

The invention generally relates to delivery of content or functionality to electronic devices, and particularly to methods of optimizing the speed and reliability of the delivery.

BACKGROUND

Portable handheld devices such as smartphones and tablet computing devices are widely distributed around the globe. In some markets, nearly every potential consumer carries their own device and uses it to send and transmit information. Devices are configured to use phone networks, like 3G and 4G networks, as well as data networks such as Internet connections accessed through Wi-Fi. Accordingly, these devices can offer their users the ability to access content almost constantly while they are turned on.

This ubiquitous and persistent connectivity of consumers offer obvious opportunities for gaming, marketing, news, communication, entertainment, and other electronic media. However, sophisticated and interactive electronic media such as interactive apps and games, group chats or "tweeting", social networking apps with frequent updates, streaming music sites, or internet auction sites can quickly burden server capability as the volume of users increases. Further, old paradigms, such as creating a web page and posting it or giving people an app to play with on their phone, are being replaced by demand for continuous active content delivery such as games, apps, or media players that involve a person with real-time events, other parties, and new information on-the-fly.

The volume of content now involved in electronic media, the number of connected users, and the resulting demands on existing content delivery technologies leads to lag-times and increased latencies, as well as slow and sometimes stopped or broken data connections. Content preparation and delivery methods are poorly suited to the demands now being placed on them. As a result, users experience delays in obtaining access to content. Also, certain kinds of content requiring quick interactivity among high numbers of users is difficult to distribute at optimal rates.

SUMMARY

The invention provides for the rapid and reliable delivery of content or functionality to electronic devices including the delivery of such executable content as apps or changes to apps. An end-user using a device experiences no down-time or interruption in service while content that they access on the device is nonetheless updated responsive to server-side changes. New content can appear at the end-user's device as fast as the end-user browses between screens, or can even be pushed to the device as soon as it comes into existence. The system is scalable to service a very large number of devices and can also simultaneously service many devices individually—delivering one-of-a-kind content personally to individual end users. Because of the speed and reliability with which content updates are delivered to and functionalized on devices, the invention provides systems and methods that enable a wide range of multi-client, real-time, interactive electronic services. In certain embodiments, the invention provides the ability to rapidly and reliably update content relating to games, online banking or trading, quizzes, surveys, e-books or news sites, or any other electronic functionality.

A multi-phased and partitioned content preparation process provided by the invention allows a client/server content management system to optimize delivery of content and behavior (hereafter called a content app) to handhelds in terms of speed, responsiveness and reliability. Content app constituent parts, called sections, are cached in memory on a server for speedy access. Only content app sections that have changed or are immediately relevant to the navigated target on the handheld are prepared and sent to the client, thus minimizing data bandwidth consumed. Sections can be pushed in real-time to the client as a result of data having changed on the server. Alternatively, sections can be manually pushed if desired. By pushing sections to the client, systems and methods of the invention cause the client to receive updated or changed content even where the client does nothing to attempt retrieval.

By partitioning the client connectivity from the content preparation—either physically, for example by separate dedicated servers, or logically, for example, through virtual machines—systems and methods of the invention cause the client to experience reliable and constant access to content, even while that same content is being updated on the server side. By partitioning content into sections, and only updating sections when they have changed and when a connection allows for it, systems and methods of the invention cause the client to experience reliable and constant access to content, even when a data connection is unreliable. The partition between client content access and other components of the systems of the invention thus insulates the client from server-side events.

In certain aspects, the invention provides a system for managing content including a production server coupled to a web interface and configured to allow, via the web interface, a producer to create a source section comprising content. The system includes a gateway server with a memory, one or more processors, and an input device, which can receive the source section. Upon receiving the source section from production, the gateway server can save the source section and read it to write a dynamic section. The dynamic section can still include the content, but in a compiled format. The gateway server can then compile the dynamic section into a compiled section, which includes the content; and send the compiled section to a client queue, from where it can be transmitted directly to a client.

In certain embodiments, the system provides a mobile application which can be installed on a mobile device, causing the device to connect to the gateway server, for example by a socket connection or an HTTP connection. The mobile device then registers as a listener with the gateway server and receives the compiled section. This causes an end-user to experience the new content, as the compiled section supplies the content to the end-user.

In some embodiments, the system includes a core database which can store group and individual data items. An individual data item is generally something personal to an end-user, such as a password or a credit card number. A group data item is generally something meant to be shared among end-users, such as an article or a game. A data item can be both, for example, the identity of a player who has won a game.

The gateway server can read a group data item from the database and include it with the source section while compiling these to produce the dynamic section. In this regard, a group dynamic section can be prepared including content which did not come directly from the production server. The gateway server can further compile the dynamic section with an individual data item to create an individual compiled section, which can include information for example that is private or did not come directly from the production server.

Systems and methods of the invention provide a binary packet format in which a compiled section is delivered to a client device. In some embodiments, as any dynamic section is compiled, it is compiled directly into a binary packet format and streamed straight to a client, in some cases without being saved in non-volatile memory like a hard drive or flash drive.

Optimization of delivery of content can be achieved by first delivering what is needed when it is first needed. For example, if a user requests content which no user has yet requested, and no dynamic section exists containing that content, the gateway server can cause the production server to send, to the gateway server, a source section containing that content. The gateway server can then, substantially immediately, compile that source section into a dynamic section and recompile it into a compiled section while streaming to the requesting client the output of the re-compilation in the form of binary packets.

In certain aspects, the invention provides an apparatus for delivering content quickly and reliably to one or more clients. The apparatus can be a computing device including, for example, a memory, an input device, and one or more processors. The apparatus can receive a source section from a production server. In certain embodiments, the source section is created, saved, and transmitted in XML format.

The source section is saved in the apparatus, where it is then read and written to a dynamic section, which is then compiled and streamed to a client, thereby delivering the content.

The apparatus can communicate with a core database which can store group and individual data items.

The apparatus can then read the source section and, optionally, a group data item to write a dynamic section and then compile the dynamic section and, optionally, an individual data item into a compiled section. In some embodiments, the core database further includes a second individual data item and the apparatus compiles the dynamic section and the second individual data item into a second compiled section distinct from the compiled section. Similarly, the apparatus can make different dynamic sections by compiling a source section with different group data items, or by compiling different source sections with a group data item. Systems and methods of the invention are broadly configurable to include any combination or cross-combination of sections and data items being compiled to produce a subsequent section or even a section at the same stage in multi-phase compilation process.

In general, "phase 1" refers to a process which can include compiling a source section, for example, as created by a producer. In phase 1, the source section can be compiled to include external content such as RSS feeds or other content not stored in the section but created by the producer, for example, articles. In some embodiments, phase 1 output includes source sections in XML format.

Phase 2 can generally refer to the process of further compiling the resulting compiled section of phase 1 to further include user-generated content. User-generated content can include, for example, pollgraphs or other statistics that is the same for all users. In some embodiments, "Phase 2" can refer to a compilation process which produces a dynamic section. A dynamic section is sometimes an active section. An active section is a dynamic section that is actively being listened to by a registered client.

Phase 3 can generally refer to a process of compiling the resulting compiled section data of phase 2 to contain user-specific data. For example, to print a user's name on a welcome screen, the user's answer on a particular question, or checking access to a particular part of a section. In certain embodiments, phase 3 can be done separately for each user, and can result in putting the resulting section data, if any, on the packet queue for the client. In some embodiments, "phase 3" includes starting with a dynamic section and results in the queuing of at least one section in binary packet format in a client queue.

The invention enables the delivery of a content app, or "app" in the form of a compiled section, to a client device. Content app is used generally to refer to the content of a section. In some embodiments, it is content or content that provides functionality to a device. In some embodiments, a content app is or includes screen logic, content, such as text or images. In some embodiments, a content app is or includes data, such as stock quotes or an update to a behind-the-scenes variable in a process running on the device.

In some embodiments, a device has installed on it an application, sometimes referred to as a mobile application or client application. The content app and the mobile application can functionalize each other. In one illustrative example, the mobile application can serve as a local, specialized operating system in which to execute the content app. In this embodiment, the content app can be executable on the device and agnostic as to that device's primary operating system or platform.

In some embodiments, different devices, which include different platforms or operating systems, are each provided with their own mobile application. Each mobile application can then functionalize a content app, regardless of the platform or operating system within which it sits. Accordingly, systems and methods of the invention can, using for example a single dynamic section as an input, compile one or more compiled sections such that each mobile device receives a content app executable on that device. In some embodiments, the invention provides mobile applications operable on platforms and operating systems which can include Java ME, iPhone, iOS, Blackberry OS, Android, or bada.

The database of the invention is highly extensible to many endeavors. It can include a large number of group or individual data items, each of which can come from being authored on the production server, being automatically generated, being supplied by a client, or being created during multi-phase compilation.

The multi-phase compilation is highly flexible and customizable, and can be used to write any number of different dynamic or compiled sections, each section including any combination of content and data items. By compiling content in multiple phases, the total amount of data that is processed is minimized. This produces significant benefits by optimizing the compilation process. For example, phase 1 needs only be done once when the source section is updated. By including general user data at phase 2, the compilation of phase 2 does not need to be repeated for each individual end user, with considerable savings in terms of processor time, cost, and efficiency. Furthermore, processes of phase 2 detect which parts of a section has changed and can send only those parts that have actually changed for further processing. Further benefits are obtained by doing user specific compilation in phase 3, thereby allowing phase 2 to be focused on general data, for example.

Systems and methods of the invention can quickly and reliably stream the compiled data sections to devices in a format consisting of binary packets, such that the binary packets include the content to be delivered.

Phase 1 of the multi-phase content preparation process can be initiated by, for example, a first logon onto the system; a request from a first client for content previously not accessed by any client; a feed manager retrieves new content; a producer produces new content; a scheduled event transpires; and a producer pushes content.

Phase 2 of the multi-phase content preparation process can be initiated by, for example the receiving by a memory of a source section comprising content; a logon by a subsequent client; and a request from a subsequent client for content previously accessed by any client.

In some embodiments, systems and methods of the invention further optimize server functionality through a process of only performing certain steps when certain conditions are met. For example, when phase 2 compilation finishes, the resulting section can be compared to the previous corresponding section and any changes can be detected. By only sending changed parts on to phase 3 compilation and the clients, the data that is processed in phase 3 is minimized.

In certain aspects, the invention provides a computer-based method for managing content that includes doing, by means of one or more processors, each of receiving a source section comprising content and saving it, reading it to write a dynamic section and then compiling it and sending the compiled section to a client queue.

The method can further include employing the one or more processors for storing a group or individual data item in a core database and writing a dynamic section or compiling a compiled section to include a data item.

In some embodiments, the method further includes comparing, by means of one or more processors, a compilation result to a previous compilation result and only sending forward those parts that have changed.

The method includes providing a production server or application which a producer an access to author a section. The access can be through a web interface. The section can be created, saved, and sent in XML format. The section can be written into a dynamic section and then compiled into a compiled section that consists of a plurality of binary packets, such that the plurality of binary packets include content to be delivered to a client.

DETAILED DESCRIPTION

1. Overview

Figure 1:
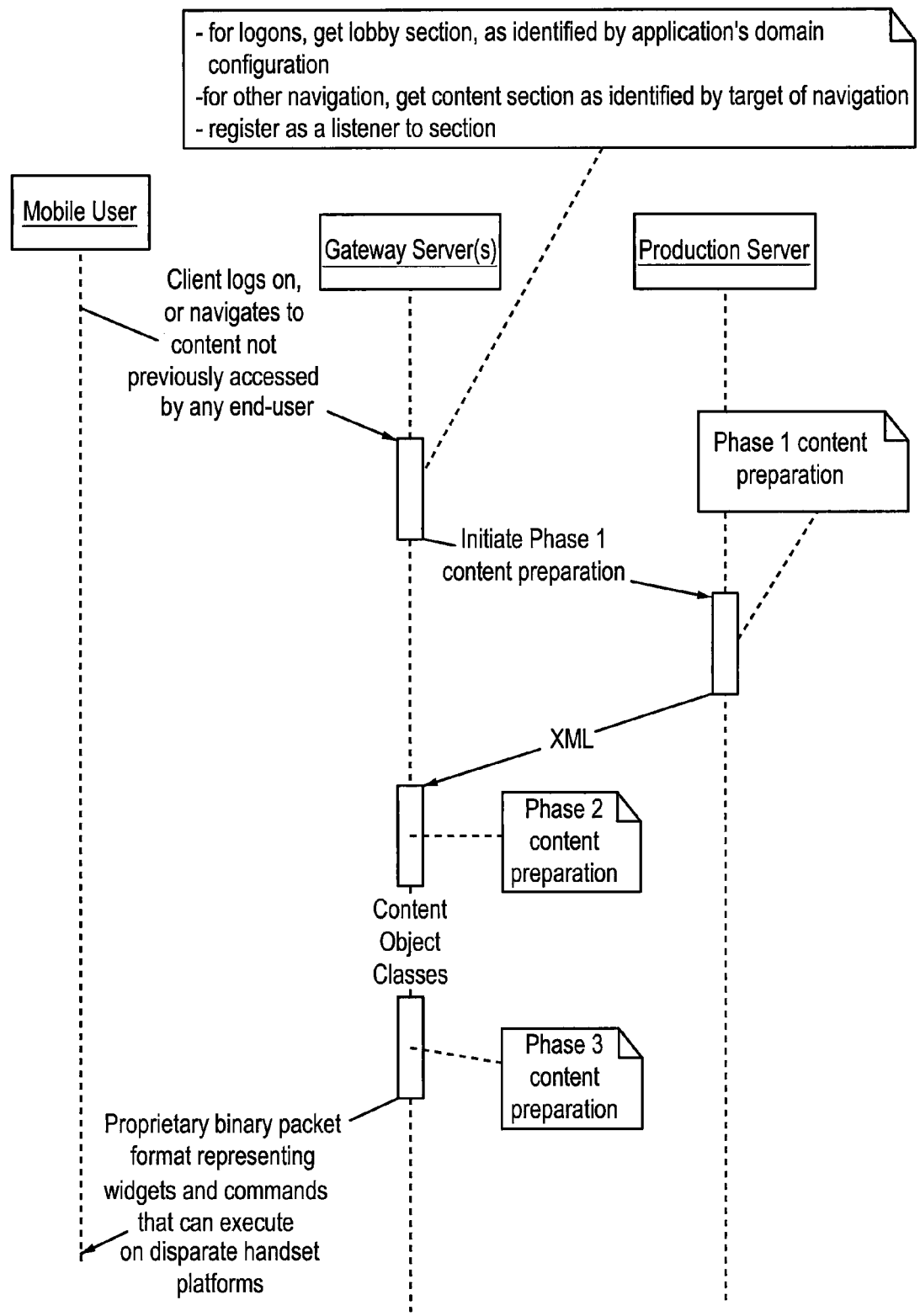
FIG. 1 illustrates multi-phase content preparation according to a logical sequence as a result of client navigation.

The invention generally provides a multi-phased and partitioned client/server content preparation process that optimizes handheld performance, responsiveness and reliability for content management systems.

A multi-phased and partitioned content preparation process is hereby described which allows a client/server content management system to optimize delivery of content and behavior (hereafter called a content app) to handhelds in terms of speed, responsiveness and reliability. Content app constituent parts, called sections, are cached in memory on the server for speedy access. Only content app sections that have changed or are immediately relevant to the navigated target on the handheld are prepared and sent to the client, thus minimizing data bandwidth consumed. Sections can be pushed in real-time to the client as a result of data having changed on the server (or it can be manually pushed if desired) thus obviating the need for the client to attempt retrieval of the data. Further, a logical partitioning between client connectivity and content preparation increases reliability for the client, as client connectivity and interactivity are insulated from problems that may occur during server-side preparation stages.

In certain aspects, the invention provides a general client/server content management system. In certain embodiments, the invention optimizes the delivery of content to handhelds.

Content delivered to clients begins on the server-side as one or more content sections comprising content. In certain embodiments, the objects are XML documents. These sections, for example, as XML, are written by a content producer. The sections include elements that describe behavior, including for example navigation between screens or how to respond to user inputs; appearance, including for example aspects of screen layout or which actual widgets exist on screens; and actual data, including for example references to actual images, user input text data, authored text data, or RSS feeds. These elements in concert can be said to constitute "content and behavior".

This "content and behavior" can be thought of as an app within an app. The outer app is the (one-time authored) handset executable for a given platform (e.g. the Java ME client or iPhone app), while the "content and behavior" is the inner (or content) app, as created by the producer. The inner app is made executable and real-time distributable by a combination of a multi-phased content preparation process on the server side and interaction with the (outer) client executable.

The invention supplies a content management system that provides full and real-time interactivity on most types of mobile device. Systems of the invention enable the creation, management, storage, presentation, revision, and delivery of content with full and real-time interaction to device users. In certain embodiments, content creation is easily done using an XML-based format, and the system supports most mobile device platforms (i.e. Java, Symbian, Windows Mobile, Blackberry, Android, iPhone and others) and is readily adaptable to new platforms as these may arise.

Systems of the invention comprise three parts: a web interface for content creation and management, as well as end user data analysis; a gateway server where the bulk of the code resides, and where content preparation and data storage are performed; and one or more client applications that run on end-user devices to deliver and allow interaction with content.

In certain embodiments, content is created as XML files using the web interface accessed via a standard browser. The content is uploaded as sections to the gateway server, and output as client sections in a packet format to be delivered to users through the client applications. The web interface can be a stand-alone application, for example, mounted on a Java servlet container such as Tomcat. Communication between the web interface and the gateway server can be done via dedicated TCP/IP socket connections.

In certain embodiments, the gateway server is a system built using Java 2 Standard Edition, with some Java 2 Enterprise Edition features also used. The server system is divided into several separate applications. Each application can be run on its own, or they can all be run together using a Virtual Machine. The gateway server communicates both internally and externally with TCP/IP socket connections. Data is sent internally as packets, using a simple packet format. The communication on the production side (i.e. using the web interface) is done using XML (in the form of XML packets). The server system also uses the packet format when communicating with the end user client application.

The client applications that are run on mobile devices are typically a Java ME MIDP application, although it has also been ported to non-Java platforms (such as iPhone) and non-MIDP platforms (such as Android). The client applications communicate with the gateway server via either a TCP/IP socket connection (preferred) or over HTTP (fallback), depending on availability. The client applications can be built in many variations, depending on project-specific platforms and technologies (i.e. Java, Symbian, Windows Mobile, Blackberry, Android, iPhone and others). If new handset platforms are created in the future, systems of the invention makes it relatively straightforward to port the client application to these as well. Additionally, one of the strengths of the system is the ease with which the system can be tailored according to the needs and demands of individual projects.

The client application is tailored to the particular device it sits on. In this regard, the client application functions like an "outer app". The client application functionalizes content delivered by the system in a client form to the device.

Content creation, performed using the web interface, takes place on the production server. Content delivery is accomplished via download or streaming sections from the production server, through the gateway server, and to the client application. Background images, text, color, and layouts can all be fully-controlled by the production server as well in real-time. Fine tuning of the layout is handled by the client device itself.

Systems of the invention were originally developed for Java ME. In certain embodiments, the system takes full advantage of the Java ME standards. All the normal features of mobile telephony, including SMS, MMS, and dialing can be used, as well as the capturing of images, audio and video that can be uploaded to the gateway server. With the introduction of the iPhone and other touchscreen devices, the system has been extended to support additional features available in these devices.

Interactivity is a key feature of systems of the invention, and many types of input can be facilitated by the client application. Users of the system can supply data items, which can be stored in a core database on the gateway server. User data items can include text, such as a user's name or a chat message. In addition to standard text and similar inputs, users can also take photos, capture video, record audio and upload the resulting multimedia files as input sent to and stored on the server.

User-supplied data items can be used as input to generate content dynamically, such that this input can be incorporated into content sections that are, in-turn, delivered to one or more users. In certain embodiments, data items are individual to an end user (i.e., a user's password, or private messages). In certain embodiments, a user's input becomes a group data item and is incorporated into content which is delivered to multiple users, for example photo sharing or group chats.

User input data items can be dynamically incorporated into content as it is distributed, thereby creating end-user apps which can be influence in real-time by real-world events.

The gateway application allows content to be pushed directly to end-users, allowing content to be updated via the web interface and sent out automatically. Updates can also occur responsive to input requests.

In order to deliver the often sizable and complex content app content and behavior (or simply, "content") to the client in a timely, responsive and reliable manner, the system uses a proprietary multi-phased preparation process and method that exhibits several behaviors. The system sends only content immediately relevant to a client's navigated target. The system sends only content that has changed since the client last loaded it (or the system can allow a particular content to be pushed, if desired). The system ensures that previously prepared content is not needlessly prepared again. The system enables real-time push of content to the client. The system de-couples client connectivity and content preparation to a great degree, to create reliable interaction and flexibility in the hardware/software configuration.

FIGS. 1-4 illustrate the sequence of events for various scenarios for content preparation.

In certain embodiments, the invention supplies system and methods for delivering content to a user that involves three phases. Phase 1 involves obtaining a source section comprising content and compiling in external data. Phase 2 involves getting the resulting section from phase 1 and compiling in user-generated data and detecting which parts have changed and sending those forward for phase 3. In certain embodiments, phase 2 produces what is called a dynamic section. Phase 3 involves re-compiling the dynamic section for each individual user, while reformatting it into a compiled section consisting of a series of binary packets and simultaneously sending it through a queue to the user.

Systems and methods of the invention segregate delivery functions into different phases to optimize the preparation and delivery. Preparation is partitioned from delivery by a logical separation between the production server and the gateway server. Phase 1 source section compilation occurs on the production server. The section compiled in phase 1 is then transmitted to the gateway server.

Phase 2 involves obtaining the newly authored content-containing source section and merging it with any content that is to be distributed to a group of users. Phase 2 occurs on the gateway server and produces a dynamic section. Phase 2 further involves detecting what has changed and only sending those things forward.

The dynamic section is re-compiled in phase 3, and only for select end-users (i.e., those who request it, or those for whom it has changed), to produce a compiled section which is immediately streamed to a client.

For example, a company may develop an app with which users participate in a contest in which users watch a baseball game during which, each time a new player is up to bat, the users guess whether the player will score. In this example, the users may be competing for a free ticket from a prize pot consisting of ten tickets. Each time a user guesses correctly, they win a free ticket, until the prize pot is depleted. In this example, each time a player goes up to bat, a file is written at the production server comprising that player's name. The file is then compiled into a source section (phase 1) and sent to the gateway server. At the gateway server, the source section, comprising the batting player's name, and a count of the number of free tickets remaining, are then both compiled into a dynamic section (phase 2). Then, for each user participating in the contents, the dynamic section, along with information about that user's name and cumulative score, can be compiled into a compiled section (phase 3), consisting of binary packets which are streamed through a queue to the user client.

These scenarios may occur as a result of client initiated activity (such as logging on, navigating to a new screen, selecting a menu item etc.), or because content may have changed on the server (e.g. updated RSS feed, producer has changed content layout, attributes, images, navigational command target (screen flow) etc.), or because a scheduled or ad hoc event has occurred.

In certain embodiments, the system supplies a production server. The production server handles resources and preparation that can be considered universal for a content app (i.e. the same for all users of the app) such as images and RSS feeds. This is known as phase 1 content preparation. Note also that it does not deal with user-generated data (such as individual user's inputs, or chats common to and generated by multiple users), nor with client connectivity.

In certain embodiments, the system supplies a gateway application. "Gateway application" refers to a set of functionality supplied by the system, and the gateway application can be supplied by a dedicated gateway server, which can comprise one or more computer, or the functionality can be distributed over a combination of hardware. The invention is scalable in that there can be a number of gateway applications, to meet the needs of a specific circumstance. In general, a gateway application or gateway server is discussed, but it is meant to include embodiments in which the functionality of the gateway application is supplied by one or more applications, which can optionally be supplied by one or more servers, or within one or more virtual machines.

The gateway application(s) handles client connectivity, resources, and preparation that are related to "grouped" end-user generated data, such as the above mentioned user inputs or chats (phase 2 content preparation), and also individual end-user specific data such as username and age (phase 3 content preparation).

FIG. 1 illustrates multi-phase content preparation according to a logical sequence as a result of client navigation.

Figure 2:
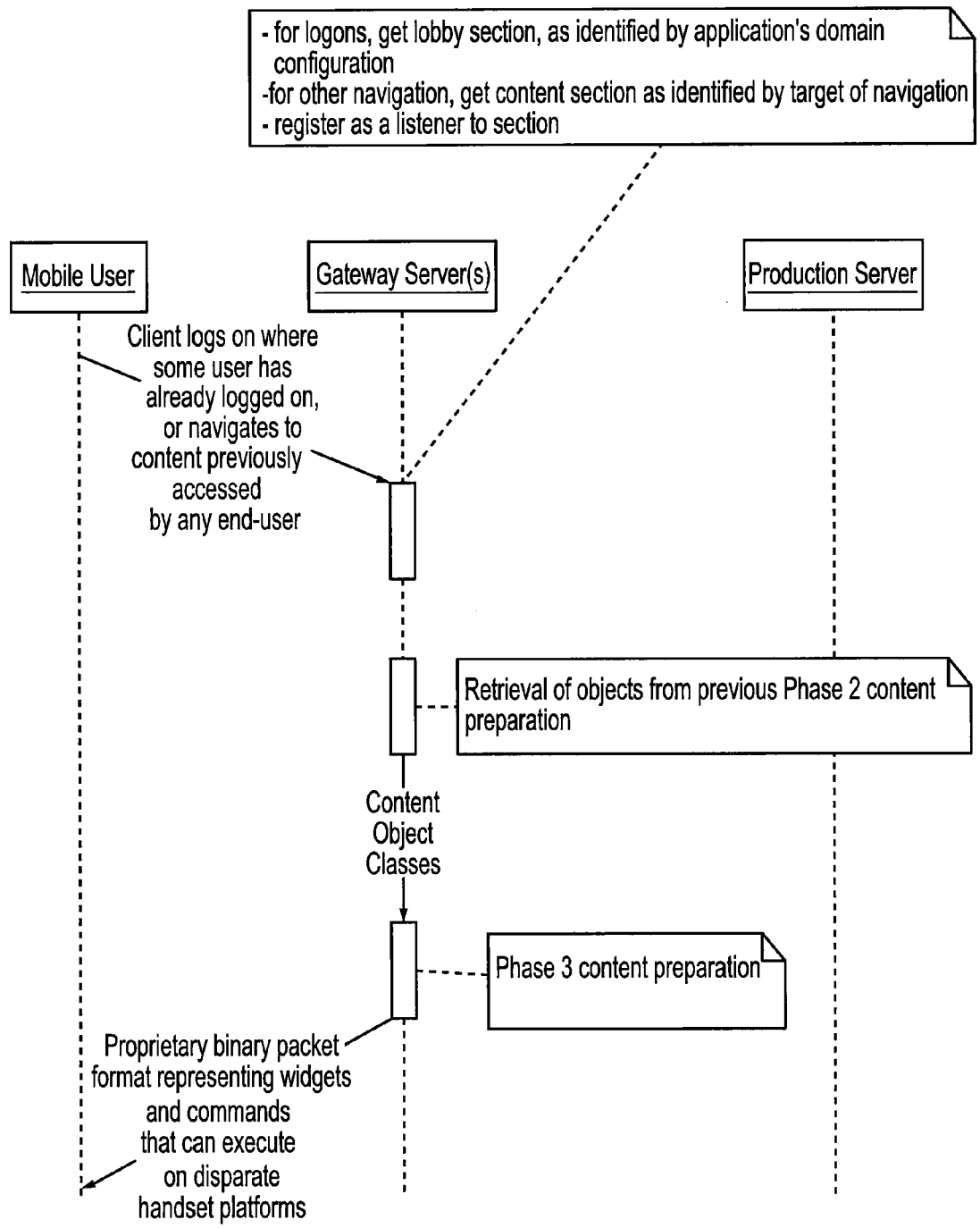
FIG. 2 illustrates multi-phase content preparation according to a logical sequence as a result of client navigation where content already exists.

FIG. 2 illustrates multi-phase content preparation according to a logical sequence as a result of client navigation where content already exists.

Figure 3:
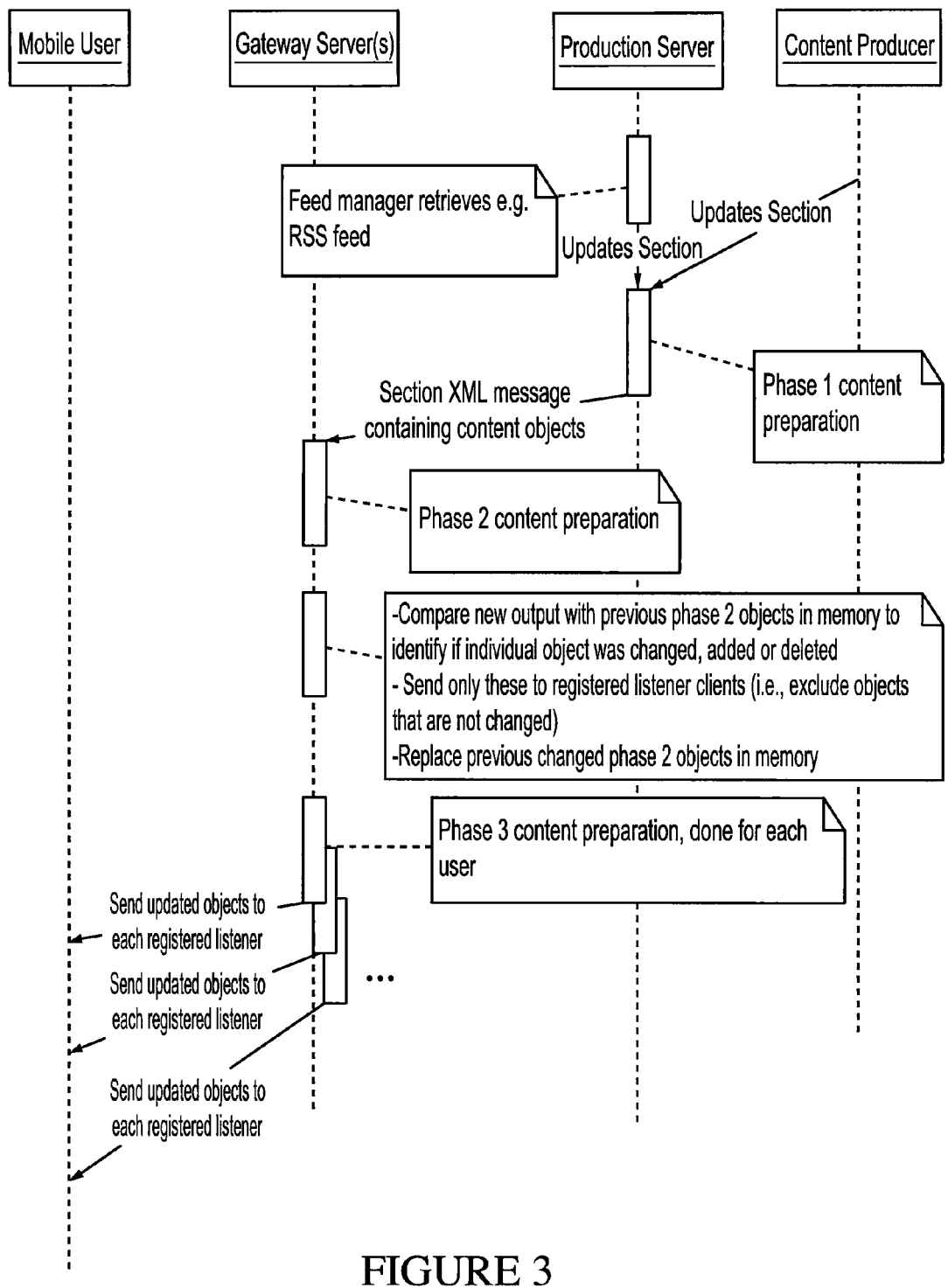
FIG. 3 illustrates multi-phase content preparation according to a logical sequence as a result of content changing on the production server.

FIG. 3 illustrates multi-phase content preparation according to a logical sequence as a result of content changing on the production server.

Figure 4:
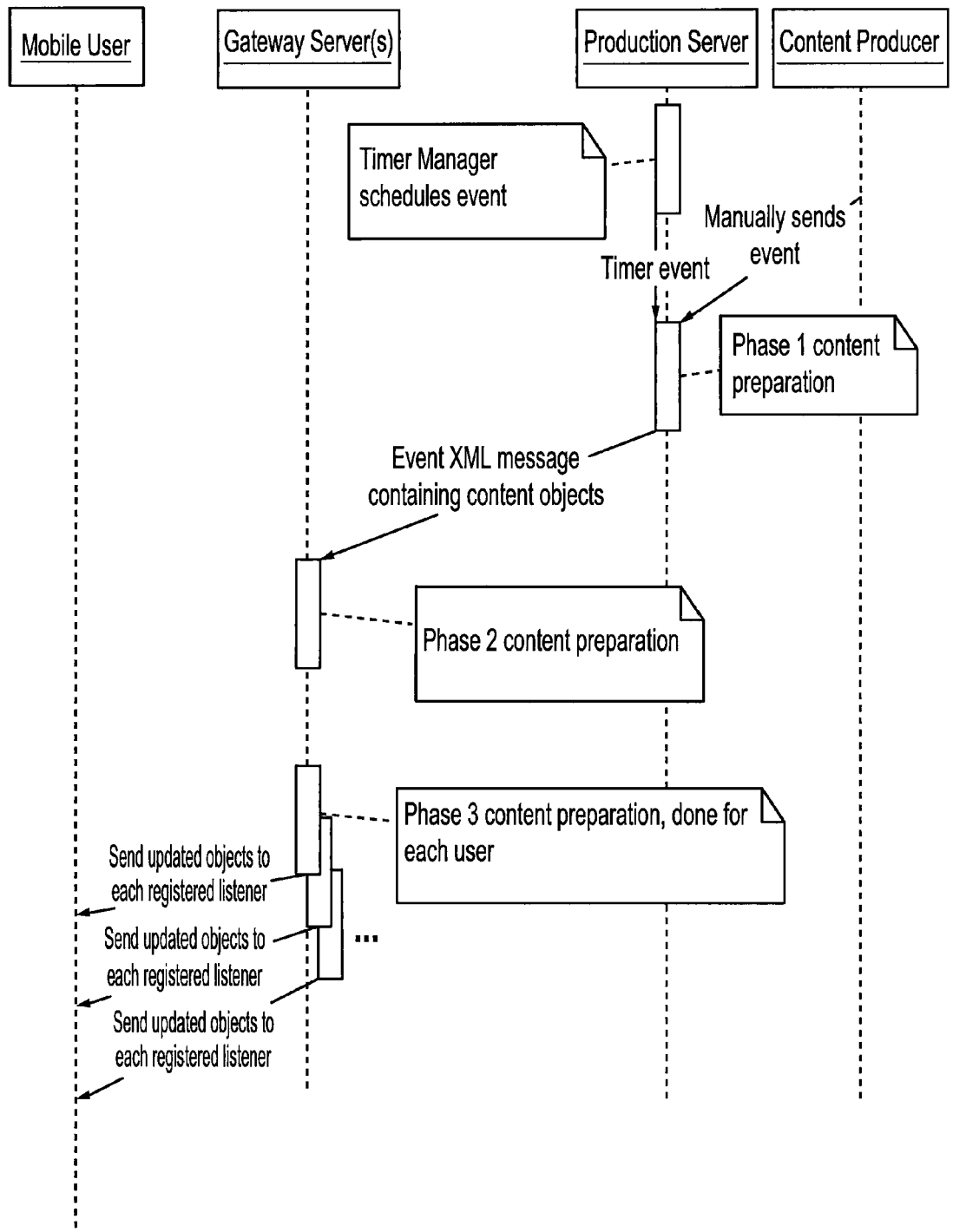
FIG. 4 illustrates multi-phase content preparation according to a logical sequence as a result of events such as a scheduled event or a manually sent event.

FIG. 4 illustrates multi-phase content preparation according to a logical sequence as a result of events such as a scheduled event or a manually sent event.

Figure 5:
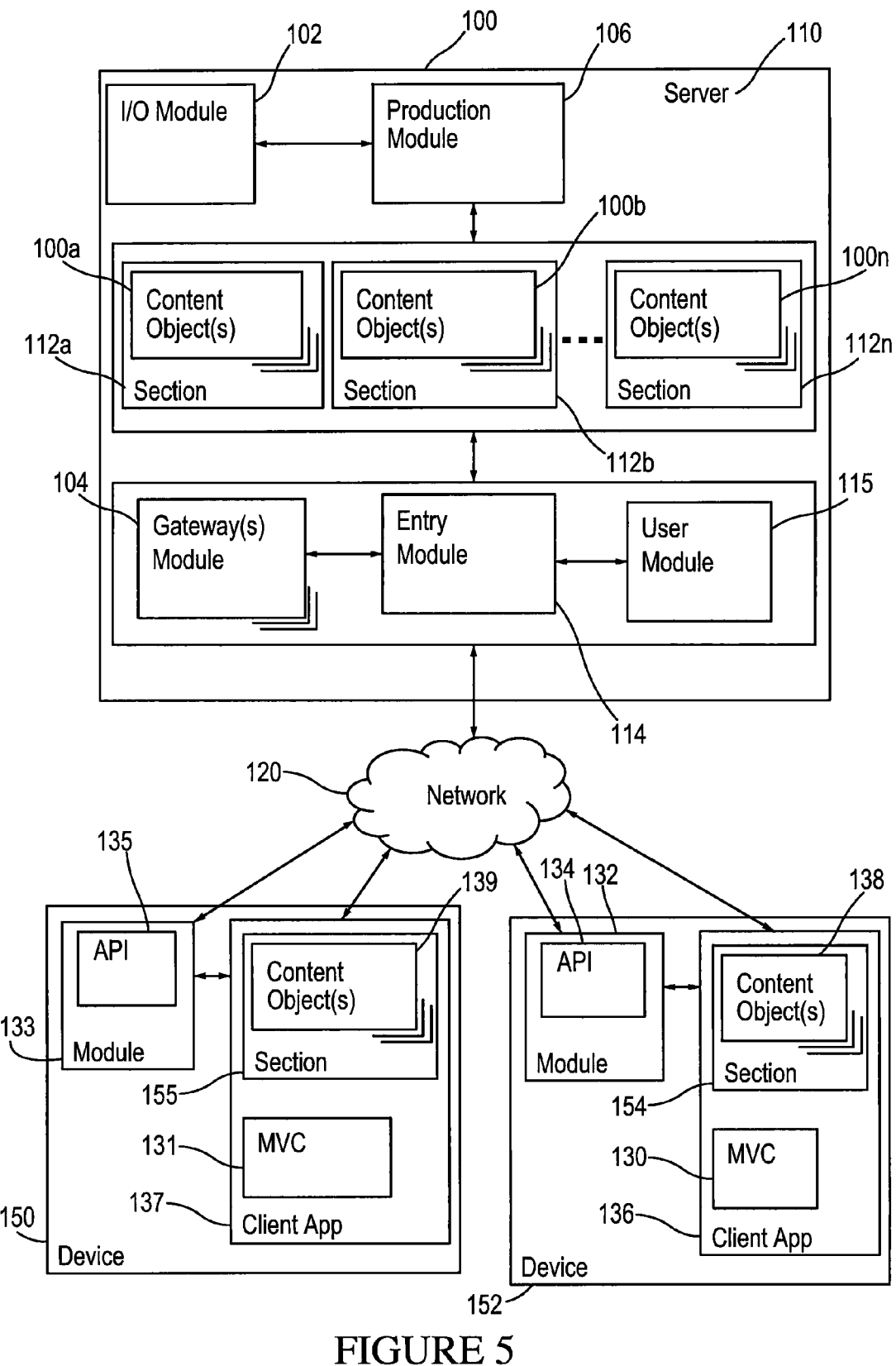
FIG. 5 provides a block diagram of systems according to certain embodiments of the invention.

FIG. 5 provides a block diagram of systems according to certain embodiments of the invention. In certain embodiments, the invention includes a production module 106 accessed by a producer through an input/output module 102. Sections 112a-112n are authored via the production module and sent to one or more gateway modules 104, which compiles them. Each section may contain one or more content object 100. Optional entry module 114 and optional user module 115 coordinate communication among client app 137 on device 150, client app 136 on device 152, and the one or more gateway 104 over network 120. In some embodiments, each module is an application. In some embodiments, each module is provided by a dedicated server.

Client app 136 receives a section 154 containing one or more compiled objects 138. Module 132 generally includes a platform such as Java or iOS, which supplies an application programming interface (API) 134. Client app 136 includes a model view controller (MVC) 130 that controls communication with the server; re-creates content object 138 as it is streamed from the server 110; controls interaction between one or more content object 138 and any other content object (s); and interfaces the one or more content object(s) with the native hardware API 134.

Client app 137 receives a section 155 containing at least one compiled object 139. Module 133 generally includes a platform such as Java or iOS, which supplies an application programming interface (API) 135. Client app 137 includes a model view controller (MVC) 131 that controls communication with the server; re-creates the at least one content object 139 as it is streamed from the server 110; controls interaction between the at least one content object 139 and any other content object(s); and interfaces the at least one content object with the native hardware API 135.

System 100 includes a number of modules. In certain embodiments, these are included in server 110. In alternative embodiments, each module is provided by a dedicated server, or some modules, for example gateway module 104, entry module 114, and user module 115, are provided as applications on server 110, while production module 106 is provided on a separate, dedicated server. In some embodiments, input/output module 102 is a web interface.

In some embodiments, server 110 is a computer-based machine containing a set of instructions for causing the machine to perform any one or more of the methodologies discussed herein. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. For example, in certain embodiments, production module 106 is a client machine and gateway module 104 is provided by a server machine 110 in communication with the client.

In various embodiments, machines of the invention can be, as necessary to perform the methodologies described herein, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while server 110 is illustrated as a single machine, the term "machine" shall also be taken to include any collection of machines that individually or jointly execute a set (or multiple sets) of instructions to perform any one or more of the methodologies discussed herein.

As one skilled in the art would recognize as necessary or best-suited for performance of the methods of the invention, devices 150 and 152 are also computer machines. In a preferred embodiment, they are each handheld computing devices such as smartphones, iPhones, tablet computer, laptops, PDAs, computers, or e-readers.

As one skilled in the art would recognize as necessary or best-suited for performance of the methods of the invention, computer systems or machines of the invention include one or more processors (e.g., a central processing unit (CPU) a graphics processing unit (GPU) or both), a main memory and a static memory, which communicate with each other via a bus. Computer systems or machines according to the invention may further include a video display unit (e.g., a liquid crystal display (LCD) or a cathode ray tube (CRT)). Computer systems or machines according to the invention can also include an alphanumeric input device (e.g., a keyboard), a cursor control device (e.g., a mouse), a disk drive unit, a signal generation device (e.g., a speaker), a touchscreen, an accelerometer, a microphone, a cellular radio frequency antenna, and a network interface device, which can be, for example, a network interface card (NIC), Wi-Fi card, or cellular modem.

A disk drive unit according to the invention can include a machine-readable medium on which is stored one or more sets of instructions (e.g., software 424) embodying any one or more of the methodologies or functions described herein. The software may also reside, completely or at least partially, within the main memory and/or within the processor during execution thereof by the computer system, the main memory and the processor also constituting machine-readable media.

The software may further be transmitted or received over a network 120 via the network interface device.

While the machine-readable medium can in an exemplary embodiment be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories (e.g., subscriber identity module (SIM) card, secure digital card (SD card), or micro SD card), optical and magnetic media, and any other tangible storage media.

2. Sections

In certain embodiments, content in the system is organized into "sections". A section is a quantum of content. In certain embodiments, sections are XML files that describe either a complete mobile application, or part of the application. Larger applications can be split into several sections to improve speed and save bandwidth. This allows for a part of an application to be updated often (e.g. a chat), leaving other sections to remain static.

Each section has a unique id, specified in the section header. Sections can be connected to each other using their ids. Sections are stored as XML elements, and can be parsed into objects using an XML framework built around the Java SAX parser when handled by the production server.

There are four types of section: 1) source sections, opened and interacted with by producers via the web interface 2) dynamic sections, that can be opened and interacted with by end users 3) dynamic sections, that can be opened and interacted with by end users 4) compiled sections, that have been compiled and are ready for the server to deliver to client applications. In certain embodiments, sections contain the nine elements listed and described in Table 1.

TABLE 1

Section Contents

| Name | Description |
|---|---|
| Head | contains information that should only be seen by the server and never sent to the end user |
| Header | contains key information, including id, name, alias and folder id |
| Main Object | the initial object displayed when the section is viewed |
| Style | optional style class |
| Theme | defines the general layout and style properties |
| Content Objects[ ] | an array showing all the content objects contained in the section |
| Server Objects[ ] | an array showing all the server objects (high-level objects only) |
| Obfuscating rules | the obfuscating rules, if this feature is enabled |
| Properties[ ] | an array showing all the section properties |

Sections are downloaded by the client application. The gateway server tracks which sections an end user keeps open, allowing it to keep the client application synchronized in real time with the content on the gateway server. The gateway server pushes updates and events to the corresponding sections on the mobile application. The client application is never sent any data, updates or events for sections that are not open. Instead, each time the client application opens a section, it is downloaded again in whole from the server, ensuring the newly-opened section is up to date.

Section content comprises: content objects (discussed in more detail below); content items; and resources.

In certain embodiments, content objects can be text boxes, menus, commands and other objects—these contain a detailed description of a content item, including how it can be interacted with by an end user. There are 2 types of content object: "high-level" abstract objects used only on the server; and "low-level" concrete objects, compiled from abstract objects to be delivered to a client application. Content items are simpler, content-oriented constructs (e.g. articles) that can't be displayed directly. Content items are parsed as server objects. Resources are media files (e.g. images, video, audio) used by client applications. Sections can link to resource files where needed.

Sections are compiled on the servers before they are sent to the mobile application, ensuring as little processing as possible is required locally, on the client device. Compilation is accomplished in 3 phases, replacing different high-level objects with low-level objects.

First, high-level objects that are not end user-dependent are compiled and inserted. Second, end user-dependent high-level objects are compiled. And third, end user-dependent content is inserted using access levels to control and/or remove content not meant for end users Once a section has been compiled, it is ready to be delivered to a client application for consumption/interaction by end users.

As can be seen from the foregoing description, sections supply the basic quantum of content for systems according to the invention. Content in the system is organized into sections, even when a higher level of organization composes sections into multi-functional content, or when sections are formatted as packets (for instance, when they are transmitted as compiled sections to end users). The sections represent logical groupings of widgets that should be treated as one unit by the client. Sections enable timely delivery of content to the client, as content apps can be segregated so that frequently accessed screens or data can be isolated into their own sections, leaving the rest of the app unaffected.

When a client logs on, the section requested is the so called "lobby" section, the initial section displayed in the content app. The lobby is identified using the domain of the application as identified in the client configuration. In this diagram, the lobby has never been selected by anyone, so phase 1 is triggered.

Similarly, when navigating to a section not previously loaded by any other client, the target identified by the navigation command will be passed from the gateway to phase 1 content preparation on the production server.

When users login or navigate to a new section, they become registered on the server as listeners to that section (i.e., they load a dynamic section, turning it into a dynamic section). This is the main mechanism whereby changed or new content later becomes pushed to the particular client. Only registered listeners will receive updates, thus minimizing bandwidth consumed and optimizing client responsiveness.

FIG. 2 illustrates a second client logging on to an application where another client has already logged on, or a second client accessing a section that another client has already accessed. In this case, objects already exist cached in memory which may be immediately furthered to stage 3. This illustrates one of the main optimizations offered by the multi-stage content preparation process.

FIG. 3 illustrates the sequence of events that occurs as a result of content changing on the production server. This could happen, for example, because the producer has authored changes in the content layout, attributes, images or navigational screen flow in the content app, or because the Feed Manager has automatically retrieved content via an RSS feed.

FIG. 4 illustrates the sequence of events that occur as a result of an event being triggered on the server. Events are special messages (containing a target and content objects) that trigger special actions on the client side. A special action triggered by an event could be, for example, causing the client to navigate to a new screen or causing the client device to vibrate, play sound, or similar.

3. Events, Quizzes, Surveys, and Reports

Events

In certain embodiments, an event is used to give clients an opportunity to participate in a quiz or survey. For example, an event is invoked on the production server, ultimately causing a client application to display to a client one or more questions of a quiz or survey.

Events can be sent in an ad hoc fashion by the producer, or they can be sent by the Timecode Manager as a result of scheduled relative timecodes (authored by the content producer) in relation to an external start signal (e.g. the manually signaled start of a quiz).

In certain embodiments, systems of the invention deliver functionality unique to the invention by providing events. For example, there is no equivalent to events in the Mobile Information Device Profile (MIDP) specification published for Java. Events allow the server to control single or groups of client applications, creating what is effectively an intranet of mobile devices linked to and controlled by the server. Events, like commands, invoke objects, however commands are issued by the end user, and events are issued from the server.

Events contain a unique ID, a Target Section and a Target Object which together make up the address specifying which object in which section the event should invoke.

Events can also contain time attributes specifying how and when the event should be triggered. These time attributes can include Delay, Issue Date, and Issued Date. Events can also be synchronized to time code, and used by the server to drive different kinds of live and/or real-time applications. These attributes can be used to deliver a specified displayable object at a pre-defined time. Events can also contain an access level to control which users or user groups will be sent the target section and/or object by the server.

Events can contain nested content objects, which will be sent by the server (along with the event) to client applications. This allows events to be used for content delivery. This can be used to display a specified displayable object at a pre-defined time.

Events can be created either by producers using the Web Interface, or created automatically by the server at specified times. Events are only sent to end users who have the target section of the client application open on their devices. Events are used to drive live games and quizzes. Table 2 lists information contained by an event.

TABLE 2

Information contained by an event

| Name | Description |
| --- | --- |
| ID | A unique identifier |
| Target section | Id of the target section (optional) |
| Target object | Id of the target object (required) |
| Delay | Delay for invoking the target object once the event has been issued |
| Issue date | Date and time when the event should be issued |
| Issued date | Date and time when the event was issued |
| Access level | Access level of the event |
| Nested objects | Content objects contained in the event |
| At when | At when the event should be triggered |
| Target | The target to invoke on the target object |

As illustrated in FIG. 5, when an event is triggered, its specified target object is invoked.

The following XML supplies an example of an event according to certain embodiments of the invention.

```
<event target_section="1" target_object="TBox">
<textbox id="TBox" title="Sample" text="This is a sample text box">
<cmd id="back_cmd" target="___back"/>
</textbox>
</event>
```

In this example, an event is sent to end users currently viewing the object main_menu in the section which has an id of "1". The event displays the text box TBox to the end users.

The event includes the text box, as well as a back command, allowing end users to return to main_menu when they have finished reading the text box.

The text "This is a sample text box" will be displayed on the mobile device as soon as the event is received by the client application, for example, substantially instantly (milliseconds later), as no time delays have been specified.

However, this example is just for illustration purposes. Events of the invention provide wide-ranging functionality. In certain embodiments, they are used to initiate or propel a quiz or a survey.

Quizzes

In certain embodiments, the invention supplies systems and methods for creating quiz-style games. A quiz is a game where a user is presented with questions and receive points for correct answers. Quizzes according to the invention are represented by a quiz content object. A quiz is made up of questions. Questions are created as separate content items. Table 3 lists different types of questions depending on what format the answer is expected to have.

TABLE 3 types of questions

| Question Type | Answer Type |
| --- | --- |
| Date Question | Date input (dd.MM.yyyy HH:mm:ss) |
| Numeric question | Numeric input (integers) |
| Text question | Text input (strings) |
| Multi Choice question | Multi choice input |
| Single choice question | Choice input |

The different types of questions are directly tied to the different kinds of user input recognized by the system. A multiple choice question contains answer alternatives, from which the user must select one or more alternative as the answer. A single choice questions also contains answer alternatives, but the user can only select one of the alternatives as the answer.

The questions are presented according to a quiz schedule. Schedules can be content items. A quiz schedule is a time schedule for when each question should be displayed. Quizzes can be time-based, with each question being presented at a relative time specified in the schedule (relative to when the quiz is started). Questions can also be presented one after another with no delay in between. Quizzes can also be live. Live quiz games work according to the quiz schedule. The quiz is started at a certain time, and after specified intervals a question is shown to the user. This requires that the schedule is agreed upon beforehand, so that the schedule can be made to display the questions at the correct times. Apart from questions, schedules can also contain quiz text boxes, which can be used to present information or display scores. Schedules can also contain quiz objects items, which can contain one or several content objects. In some embodiments, text boxes and object items are displayed at the time (or in the order) that is defined in the schedule. The questions can be compiled as input object and sent along with the section where the quiz is specified. The questions can be controlled by the quiz schedule. Whenever a question should be shown to the user, the server sends a quiz event to the mobile application invoking the input object that represents the question. The schedule can either be started automatically at a specific time, or be started manually from the web-interface.

TABLE 4

| Quiz Item | Description |
|---|---|
| Quiz Question | See table above |
| Quiz Schedule | Schedule describing order and timing of quiz items |
| Quiz Text Box | Text box, which can contain text and be displayed in a quiz |
| Quiz Objects Item | Item, which can contain content objects to be displayed at some point in the quiz |

In certain embodiments, the invention provides applications that can be used along with TV game shows, allowing viewers to participate live during the show. By creating a schedule ahead of time, which times the questions with the TV show, the user will be presented with each question at the same time as it is presented on the program. This allows users to compete against each other while watching the show, providing viewers with an interactive experience while watching.

In certain embodiments, the invention also supplies objects for calculating scores and displaying top lists showing which users scored the best in the quiz. Points for questions are specified in each question item. For instance, in a multiple-choice question, each alternative is given a numeric value indicating how many points the alternative is worth. If there is only one correct alternative, and each question is worth one point, the correct alternative would be assigned a value of one point, and all other alternatives a value of zero points. After a quiz has ended, scores are calculated per user, and a top list can be created by comparing scores. The results can be shown to users using either the quiz question results or quiz result list content objects. Both represent a menu, containing results for questions. The results are presented for each question, showing in percentages how many users answered what alternative. The difference is that in a quiz result list, the statistics are displayed as a chart, and in a quiz question results object only numerically. A user's individual information can easily be shown using text variables. Predefined text variables can include, for example: $ {user}, $ {score}, $ {maxscore}, and $ {toplist(_schedule( . . . ))}.

The graphical representation of quiz results are done as "pollgraphs". A pollgraph is a displayable content object, representing a graph made up of a number of bars. Depending on settings, the bars can either be horizontal or vertical, and the graph can be set to display percentages (the sum of the all the values each bar represent are 100 percent). Basically, pollgraphs are a graphical representation of voting that can be displayed in real-time. The result shows the percentage of the vote each option has gotten so far.

Quizzes that do not use a timed schedule can be taken offline. Offline quizzes uses separate compilation methods. This is because an offline quiz must be able to run without any interaction with the server, so the questions have to be invoked on the client at the right time, and the final results have to be saved on the client and be sent once the client can connect to the server again. In order to make a quiz work offline, the schedule, section, questions etc. have to be downloaded or saved on the client.

Quiz questions can be presented in a random order. The randomization is done during the final compilation phase, meaning that each user is (potentially) presented the questions in a unique order.

Surveys

In certain embodiments, systems and methods of the invention provide tools for conduction a survey. A survey is fairly similar to a quiz, as it consists of questions and user supplied answers. The answers are of primary interest to the creator or sponsor of the survey. Surveys can, for instance, be used for market research and statistics gathering. Surveys can be created by using a lot of the same objects and items used in the creation of quizzes. Surveys use the same question and schedule content items as quizzes do. As surveys are not games like quizzes, but instead all about gathering statistics, the scoring features of quizzes are not used. Instead the user is presented with questions according to the schedule and the answers are recorded (just as they are with quizzes). By using access levels for questions, questions can be presented based on how users answered previous questions, which can be used to ask follow-up questions if needed.

As with quiz results and result lists, the answers from all users that have taken a question can be compiled into statistics and displayed either to end-users or retrieved from the server. Survey results can be displayed graphically in the web-interface, using open flash chart, or downloaded as CSV, XML or open flash chart JSON files.

In one exemplary embodiment of the invention, the "quiz" is a client side survey, which uses the schedule with id 1. The quiz content object is a part of a section. The schedule with id 1 is called "survey schedule" and contains three questions. The schedule is stored as a separate content item. Finally, the question with the id 2 is the first question that is displayed. It is a single choice question with two alternatives.

Reports

In certain embodiments, systems and methods of the invention provide tools for creating reports. Reports are a way to customize how data from surveys or quizzes is retrieved and output. In certain embodiments, reports are created as XML documents, detailing various options regarding how the data will be printed, as well as allowing the user to select which data to output. A report contains schedules. Schedule can contain "survey items" and "events", which are form answer items recorded in the database and quiz questions within the schedule.

4. Content Objects and Subclasses

Systems and methods of the invention provide content objects, which can be included in the sections. Content objects are constructions according to certain embodiments of the invention that contain detailed descriptions of content items. Some objects describe visual elements to be displayed on mobile screens (displayable objects), while others describe non-visual elements or interactive functionality. Content objects comprise four different sub-classes: displayable objects; input objects; item objects; and resource objects.

In certain embodiments of the invention, content objects are stored in XML in client application sections. Accordingly, phase 1 preparation operates on a source section comprising at least one content object, and phase 2 preparation involves compiling the source section into a dynamic section comprising a corresponding content object.

Some displayable content objects, such as forms and menus, often contain other content objects. Objects added to forms may not necessarily be displayable on their own. Some objects may contain nested objects, creating a dependency between them. There can also be chains of nested objects. For example, a menu could contain further menus which in turn could contain further content objects. To keep track of such dependencies, they are represented by an object class of their own, and all content objects store any dependencies they have.

There are two levels of content object. High-level objects, for example, can generate menus with links to article text boxes from feeds. Low-level objects, for example, can be simple menus with defined styles, titles and items. High-level objects are for internal use only on the server, and must be converted via section compilation into lower-level objects before they can be sent to client applications.

Certain projects may require the creation of new and specific bespoke content objects.

New types of content object can also be added to the system as plug-ins if this is more appropriate.

All content objects contain the information listed in Table 5.

TABLE 5

Content object contents

| Name | Description |
| --- | --- |
| Id | Identifier (mandatory) |
| Name | Text identifier (optional) |
| Style | Style class (optional) |
| Access level | A set of rules defining which users are allowed or denied access (optional) |
| Properties | An array showing the object's properties |

Content objects in a client application are normally kept up-to-date with the gateway server in real-time. At the discretion of the project producer, the gateway server can automatically track when content objects are invoked by end users, and/or if displayable objects are in use, unless the client application is being used in off-line mode, in which case this information can be retrieved as soon as the app is back online.

Content objects are identified by a unique identifier and are linked together using these ids. All objects also have an access level, allowing producers to define which users are allowed or denied access to the object.

Some content objects are similar to objects in Java ME technology, while others are uniquely supplied by systems and methods of the invention. A list of content objects appears in Table 6.

TABLE 6 list of content objects

| | |
| --- | --- |
| ArticleListMenuItem | An item on an article list |
| ClientSideSurvey | A survey of questions delivered to end users |
| Command | An action taken on an invocable object |
| CompositeTarget | An aggregation of several targets in a single command |
| Countdown | A countdown of time remaining |
| Feed | A web feed |
| photoAlbum | An album containing images |
| Quiz | A series of questions requiring end user responses |
| sectionLink | A link to another section |
| SMS | An SMS |
| StyleClass | Defines screen layout and style properties |
| Ticker | A line of text that repeatedly scrolls across the screen |
| UrlRequest | A hyper-link to a specified URL |

Content objects comprise at least four different sub-classes: displayable objects; input objects; item objects; and resource objects. A displayable object is an object that can be displayed on-screen. In certain embodiments, a displayable content object is similar to an MIDP displayable object. A list of displayable objects appears in Table 7.

TABLE 7

A list of displayable objects appears

| Object | Description |
| --- | --- |
| Alert | Displays an alert to the user. |
| AnswerList | Displays a list of answers. Answers can be any kind of user input, including images or text. Can also be used for chatting, or to display user-uploaded images (inc. photos). |
| ArticleList | Displays a list of article content items in a menu with text boxes containing the article text. |
| FeedItemList | Displays feed item titles in a menu with links to text boxes that contains the actual article text. |
| Menu | Displays a menu where the user can select a menu item. |
| PhotoViewer | Displays a photo album. |
| PollGraph | Displays a bar chart graph. |
| QuestionResult | Displays the result of a question. |
| QuizControl | Displays a number of questions stored as content items. |
| QuizQuestionResult | Displays the result of a quiz question. |
| QuizResultList | Displays a list of quiz question results. |
| ResourceCommentList | Displays end user comments on an image. |
| SectionList | Displays a list all of all the sections forming a project. Can be used as a menu in applications to simplify accessing other sections. |
| Table | Displays a table, where each cell contains text strings. |
| TextBox | Displays a simple text box, consisting of a title and a text. |
| VideoPlayer | Displays a video player. |

The most basic form of displayable object is a TextBox, which consists of a title and a text. Another useful displayable object is a Menu, which shows a list of alternatives to be chosen by an end user. Choosing a menu item invokes a target. Forms are containers that can contain more complex layouts of text, images, and/or other items. All input objects are also displayable objects. Each displayable object can be associated with any number of targeted commands. Commands are ready for invocation by an end user as soon as the object is displayed on-screen. Each displayable object can also have a defined style. Styles contain information about colors, graphics, and simple layouts for the title and content bars, as well as for the section itself.

Input objects are another class of content objects. Input objects are used for processing end user input. Simple input objects allow an end user to type in or select a value that gets sent on to the server. Each end user input item is referred to as an "answer" on the server (as in "an answer from the end user") and is stored in a core database with a time stamp. Input objects (i.e. text inputs) often employ a mobile device's own GUI, since input methods can vary between devices.

Input objects can also be placed in forms, allowing a multitude of different inputs to be associated (much like HTML forms). All input objects are also displayable objects. Table 8 gives a list of input objects.

TABLE 8

A list of input objects

| Object | Description |
| --- | --- |
| AudioInput | Allows an end user to record an audio clip |
| ChoiceInput | Allows an end user to choose one of several alternatives |
| DateInput | Allows an end user to input a date |
| FileInput | Allows an end user to input a file. |
| Form | A displayable object that can contain different items, such as inputs and/or images |
| ImageInput | Allows an end user to take a photo |
| MultiChoiceInput | Allows an end user to choose from a number of alternatives from a list. |
| NumericInput | Allows an end user to input an integer value. |
| Text Input | Allows an end user to input plain text. |
| VideoInput | Allows an end user to record a video clip. |

Inputs and answers are used to run quizzes, competitions, games, surveys, polls etc. A quiz and its inputs and answers can be configured so that an end user's answers can be scored, and the data thus gathered can be used to generate top scorers and other types of lists, analyzed as per a project's data analytics requirements (e.g. for market research), as well as output to third party software packages.

In certain embodiments, all the quiz/competition/game/survey/poll logic resides entirely on the gateway server where all the processing and data storage is performed; and apart from its I/O functions (i.e. sending inputs and answers onto the sever, and delivering display and content objects to the mobile device screen), the client application performs none of the processing and stores none of the associated data.

The client application displays the different types of inputs (with predefined start values) and sends the answers back to the server. Input objects can be used in both online and offline mode. Some input objects represent file uploads from end users (e.g. photos from the device camera if it has one, audio and/or video clips, etc.). Input objects can also be used to upload other forms of file, using the file input object.

Item objects are another class of content objects. Items objects can be placed into forms. Items are not displayable on their own, but need to be placed into forms to be displayed. Item objects are not the only objects that can be placed in forms-input objects can be used in forms as well. Table 9 supplies a list of item objects.

TABLE 9

A list of item objects

| Object | Desription |
| --- | --- |
| Button | A button |
| HyperLink | A hyper-link |
| ImageItem | An image |
| SpinButton | A spin button |
| StringItem | A string |

Resource objects are a class of content objects. Resource objects describe resources. Resources are stored on the server's file system, and are downloaded to client applications separately from the content. Table 10 is a list of resource objects.

TABLE 10

A list of resource objects.

| Object | Description |
| --- | --- |
| Audio | Audio image resource |
| Image | Image resource |
| Video | Video clip resource |

5. Section Compilation

Content objects exist in sections, the basic quanta of content according to certain embodiments. In certain embodiments, content creation begins the authoring of a source section via the web interface. The source section generally comprises at least one high-level content object.

Source sections comprising high level content objects needs to be compiled in order to be processed by client applications. Compilation replaces high-level objects with low-level objects that can be understood, handled, or displayed directly by client applications.

On the server, sections are either handled as XML data, or parsed into objects. When sections are parsed, all their content (commands content objects, etc.) is parsed as well. XML parsing and writing is handled by the XML framework. Systems and methods of the invention supply a framework to process XML, which utilizes the SAX (Simple API for XML) parser (included as part of the Java software package).

Sections are created at the production application; compiled, and sent on via the gateway application to client applications.

The production application stores its data (apart from resources) in the production database. However, the production application does not have direct access to the core database, where end user data is stored. For this reason among others, section compilation is done in 3 phases; primarily in order to optimize performance by minimizing the amount of content that needs to be compiled separately for individual end users. In phase 1, content associated with data stored in the production database is compiled by the production application. In phase 2, end-user group content, associated with data stored in the core database, is compiled by the gateway application. In phase 3, individual end user content, associated with data stored in the core database, is compiled on an individual/as-needed basis by the gateway application. Each phase is discussed in more detail herein.

As can be seen from the foregoing, systems and methods of the invention provide functionality in the form of quizzes, surveys, and reports. As discussed above, in order to deliver the sizeable and complex content in a reliable and timely manner, systems and methods of the invention provide a multi-phased preparation process that sends only content that is immediately relevant to a client's navigated target. The multi-phased process also sends only content that has changed since the client last loaded it, and ensures that previously prepared content is not needlessly prepared again. Systems and methods of the invention enable real-time push of content to the client, and de-couple client connectivity from content preparation as much as possible.

In each scenario of content delivery, as illustrated in FIGS. 1-4, content is prepared in three phases. Phase 1 involves obtaining or creating a section comprising content. Phase 2 involves compiling the section a first time, producing what is called a dynamic section. Phase 3 involves re-compiling the dynamic section for each individual user, while reformatting it into a compiled section consisting of a series of binary packets and simultaneously sending it through a queue to the user. Each phase is herein explored in more detail.

Phase 1

In phase 1, content associated with data stored in the production database is compiled by the production application as described in FIG. 1. XML source files are reconstructed into compiled dynamic sections, and user-independent high-level objects are replaced by low-level objects where possible. Compiled dynamic sections remain in XML format. Phase 1 compilation is performed for example when a section is loaded, reloaded, and/or updated, as well as at regular intervals (as part of the production server's general maintenance routines).

The first step of Phase 1 compilation is to copy basic section information to the newly generated compiled section. Then the actual compilation takes place, whereby content objects are complied, and headers for images are generated and inserted. The section is then parsed and content objects are checked and compiled if required. All content objects have their individual compilation methods specified, and each type of object is compiled using that method. Web feeds (RSS, ATOM) are fetched at this point (and checked for updates at regular intervals by the server afterwards) and inserted as ordinary menus and text boxes. This is done only once for all end users and does not create any noticeable load on the server or, for example, to feed providers.

Phase 1 content preparation creates low-level output, in the form of one or more source sections, that is universal to all users of an application, but is not content generated by users (such as chats, comments, etc.). In certain embodiments, phase 1 preparation takes as input XML that has been authored by or for the content producer. This XML contains high level elements that will be transformed into lower level ones by phase 1. An example of this would be an ArticleList element being transformed into a Menu element containing MenuItem, TextBox and Image reference elements.

Sections produced in this phase are stored in memory and Gateways may be registered to receive updates. Phase 1 objects are flushed from memory if they are not currently needed, in order to conserve memory.

By separating the preparation of this data into a separate phase, timely delivery and client response time is optimized as this phase does not have to be repeated for every individually attached client needlessly. Bandwidth and server resources are also conserved.

Phase 1 preparation produces a dynamic section upon which phase 2 operates.

Phase 2

Phase 2 content preparation takes as input the XML output of phase 1 preparation. In phase 2, content that is user generated and can be considered universal to groups of users on the app is prepared. Examples of this kind of content are group chats (all users see the same chat) and public comments. Sections produced in this phase are stored as content objects in memory on the gateway server, where they are available to all registered listeners.

When phase 2 objects are first compiled, they are compared to previous version in memory if they exist. If an object is identified as being changed, new or deleted then this triggers the sending of only those objects to registered listeners. Communication with the client is still at the section level, but the section will only contain the affected objects. These objects will also replace the old ones in memory.

In phase 2, end-user group content, associated with data stored in the end user database, is compiled by the gateway application. Phase 2 compilation is essentially similar to phase 1, but without any image header generation. Phase 2 compilation is performed, for example after a phase 1 compilation; when a content update is required as a part of the synchronization process; when a client application connects to the server, for example by logging on or by requesting content; or at regular intervals. In some embodiments, after a client application connects to the server, the dynamic section requested by the app is registered, reloaded, and recompiled prior to download.

The input to phase 2 is a phase 1 compiled source section. Sections being used by a client application are termed "loaded". A section that is active on the gateway is opened as a dynamic section. Dynamic sections check for updates on the production server and are automatically synchronized with the source section, instantly pushing any changes to the client application. Each time an update is made, the dynamic section is recompiled. Phase 2 was created as a way of optimizing the compilation process by reducing the amount of content that needs to be compiled for individual end users.

In one exemplary embodiment according to the invention, a chat is a type of group content that looks the same to all end users, so it can be compiled in Phase 2.

Alternatively, a form is a type of content that contains different data for each individual end user (e.g. nickname, age, and other personal info) and each form needs to be compiled separately. Dynamic sections are prepared to be sent to the end-user client in the final phase of preparation, phase 3. To send a personalized form to an end-user, a generic (or "empty") version of the form would be supplied as a dynamic section, at least one data item individual to that end user would be retrieved from the core database, and the dynamic section plus the individual data item would be compiled into a compiled section in phase 3.

Phase 3

Phase 3 content preparation takes as input the (object) output of phase 2 preparation. In phase 3, content that is generated by individual users and which does not apply to groups of users is prepared. Examples of these individual data items are personal user inputs such as username or age. In addition, access level controls are checked at this stage, and objects which, for example, have been configured to not be visible to a certain user are removed. Phase 3 also finally creates binary artifacts in a packet protocol that is streamed to the client via socket communication (discussed in more detail under "6. Communication and data format", below).

Individual data items, associated with data stored in the core database, is compiled on an individual/as-needed basis by the gateway application as. After phase 2 compilation is completed, objects are split into separate packets to undergo Phase 3 compilation, and any required translations are made, before being delivered to the client application. After compilation and translation, the packets are output ready to be compressed and delivered to the client application.

Phase 3 compilation is performed when content is sent to a client application, including when an end user connects to the server, or when an update to a section is generated.

The access levels for both the end user and the content object are checked. If the user has access to the object, it is compiled. If not, the request is ignored. Compilation performed in this stage is object specific. If a translation is also needed, this takes place after compilation. Finally, the packets are added to an array, compressed, and sent to the client application.

This step is optimized carefully since it is done for every user. During this phase all individual data items are inserted. For example, a form containing personal information like end user name, age, sex etc. would be filled in with the individual's corresponding information as stored in the core database. User-defined web feeds are imported at this point (and checked for updates at regular intervals, on a unique feed basis).

The binary artifacts in the packet protocol created by phase 3 correspond to the individual widgets and other content that constitute a section, and these can exist as Java classes on the server and in equivalent ported format for the various platforms on the client. This is the manner in which the content app is made to be cross-platform.

Phase 3 output is not stored in memory as this data is produced on a per-client basis and is not re-usable by others. The output is put directly to the client's individual delivery queue.

In order to optimize delivery of content to the client, part of the multi-stage content preparation process involves the ability of the server to push changed content or events to individual clients.

As sections are prepared into packets ready to be delivered to the client, these are sent to client delivery queues, one per connected client. A fixed and configurable number of communications manager thread processes execute in the background in order to retrieve packets from these queues and send them to the registered listeners (clients). As a result of this architecture, output from content preparation is de-coupled from client connectivity, i.e. the output production is non-blocked.

In certain embodiments of the invention, plug-ins can be used to add to or modify client applications. If the additional functionality provided by the plug-in requires custom content compilation, this may require all 3 phases of the compilation process. It is also possible to create and/or use a custom compiler for a plug-in. For example, prior to phases of preparation as described above, the server checks for any other registered custom compilers, and runs these first.

The multi-phase content preparation process intentionally decouples client connectivity from content preparation, in order to optimize the user experience in terms of client connectivity and interactivity.

If phase 1 has any problems creating new content, the old content stays in memory so that client interactivity is not affected. Indeed, the production server (or production JVM if hosted on the same server as the gateway) can be restarted at will without affecting client navigation and interactivity.

A natural consequence of this is also flexibility for hardware configuration. The Production server can be situated in a place more accessible for the content producer.

6. Communication and Data Format

Systems and methods of the invention provide several independent server applications, a web-interface and mobile clients. Communication between these parts of the system is done either over a Java socket port or HTTP port 80. Both communication protocols are used in order to accommodate differences in both mobile device configurations and the varying reliability of raw socket ports compared to HTTP port 80 communication at various telecoms. Whether using a socket port or HTTP port 80 connections, the payload is a binary artifact comprising packets according to a packet protocol supplied by the invention. There can be many kinds of packets, which carry different kinds of information (such as event packets, different kinds of answer packets, content-object packets and so on). The packet format can be simple, including for example a small header, containing information about what type of packet it is and what length the packet is. Packets can be sent using Java DataOutputStreams, with the packets encoded as byte arrays. The packet format is shown in Table 11.

TABLE 11

| Packet format | | |
|---|---|---|
| Field size | Field name | Field content |
| 2 bytes | type | Packet type identifier |
| 4 bytes | length | Payload length(in bytes) |

XML

In certain embodiments, all content is stored in an XML format and much internal communication on the servers uses XML. Systems of the invention provide an XML framework. The framework is implemented using a facade design pattern over the Java SE SAX parser.

Sections are parsed into individual XML elements. Some elements are mandatory for each section, such as a header (containing the section id) and a main object (used as the entry point for the application described in the header). Optional section elements that are parsed are content objects, server objects (high-level objects that are only used on the server), styles and themes, section properties and obfuscating rules.

All objects are then parsed according to methods specific to the object. Object types are identified using integer values. Content objects are first divided according to type, and then the content is parsed further according to methods specific to the type of the object. In reality, the parsing takes all information out of the XML elements and places it in arrays, containing attribute-value pairs. This makes handling objects easier. Content is sent to the clients using this parsed format as binary-encoded packets as shown in the example below.

Communication on the server is mostly done using XML packets. XML packets are written to output/input streams using an XML writer that is a part of the XML framework.

Binary Format

Before packets are sent from the server to the client application, or vice versa, they are transformed into a binary format instead of XML. Packets are sent with an encoding, using the packet format above. XML is not used on the clients, so all content objects are sent as binary packets between the client and the server. An example of a binary "content object" packet looks as follows:

The original XML data:

```
<menu id="menuid" style="menustyle" default_cmd="sel_cmd" title="My menu">
  <cmd id="sel_cmd" target="___select"/>
  <cmd id="back_cmd" target="___back"/>
  <item id="item0" target="someobject"/>
  <item id="item1" target="anotherobject"/>
  <item id="item2" target="___exit"/>
</menu>
```

After XML parsing, the menu object is made up of an array of menu items, and an array of commands. Each Item and command has an id and a target. The information is then converted to a byte array, and sent using a Java DataOutputStream

| Field size(bytes) | Field description | Field content |
|---|---|---|
| 2 | Packet type | "1" (content object) |
| 4 | Content length | "136" (packet content length in bytes) |
| 2 | Object type | "1" (menu) |
| 2 + 6 | Object id | "6" (length of string) + "menuid" |
| 2 | Menu item count | "3" |
| 2 + 5 | Item[0] id | "5" + "item0" |
| 2 + 10 | Item[0] target | "10" + "someobject" |
| 2 + 5 | Item[1] id | "5" + "item1" |
| 2 + 13 | Item[1] target | "13" + "anotherobject" |
| 2 + 5 | Item[2] id | "5" + "item2" |
| 2 + 6 | Item[2] target | "6" + "___exit" |
| 2 + 7 | Menu title | "7" + "My menu" |
| 2 | Command count | "2" |
| 2 + 7 | Command[0] id | "7" + "sel_cmd" |
| 2 + 8 | Command[0] target | "8" + "___select" |
| 2 + 8 | Command[1] id | "8" + "back_cmd" |
| 2 + 6 | Command[1] target | "6" + "___back" |
| 2 + 7 | Default command | "7" + "sel_cmd" |
| 2 + 9 | Object style | "9" + "menustyle" |

Actual binary packet:

```
00 01 00 00 00 88 00 01 00 06 6D 65 6E 75 69 64 00 03 00 05 69 74 65 6D 30 00 0A 73 6F 6D 65 6F
62 6A 65 63 74 00 05 69 74 65 6D 31 00 0D 61 6E 6F 74 68 65 72 6F 62 6A 65 63 74 00 05 69 74 65 6D 32 00
06 5F 5F 65 78 69 74 00 07 4D 79 20 6D 65 6E 75 00 02 00 07 73 65 6C 5F 63 6D 64 00 08 5F 5F 73 65 6C 65
63 74 00 08 62 61 63 6B 5F 63 6D 64 00 06 5F 5F 62 61 63 6B 00 07 73 65 6C 5F 63 6D 64 00 09 6D 65 6E 75
73 74 79 6C 65 XML size: 267 bytes Binary size: 142 bytes
```

Connectivity HTTP Fall-back

In order to optimize reliability of content delivery to the client, part of the multi-stage content preparation and delivery process involves the ability of the client and server to fall back to plain HTTP communication in the event that the regular (preferred) socket communication does not work.

Regular client communication is performed using 2-way communication over a socket connection between the Gateway Server and the (outer) client app. In the event that this connection does not work for whatever reason, it is replaced by a simulated connection over HTTP. This connection is maintained by the client polling a Gateway server HTTPS-ervlet (which is the manner in which content may still be pushed over HTTP).

7. The Servers and Applications

In certain embodiments, the invention provides four applications, each of which can be supplied in a dedicated server: production application; user application; entry application; and gateway application. In certain embodiments, the invention includes a web interface application. Systems and methods of the invention supply the ability to create content, process and compile the content, maintain end-user connectivity, distribute the user (outer) applications, and distribute the compiled content to the user applications.

In certain embodiments, the invention includes four stand-alone applications which supply different functionality. These applications can be partitioned physically, for example as separate machines or servers, or logically, for example as separate Java virtual machines. In certain embodiments, they can all be run on the same machine and JVM. This logical partitioning of the server allows for scalability. For example, multiple gateways can be configured as required to handle increasing numbers of connected users. The partitioning also allows for updating only parts of the applications or servers at a time, meaning that the entire system does not need to be taken offline for updates. Similarly, a crash in one of the server applications will not cause the entire system to crash.

Internal communication between the different applications is done over TCP/IP, using sockets. All data is sent as packets, using simple packets consisting of a small header and a payload containing data.

Production Application

The production application handles creation and storage of content and resource files (images, video clips, etc.). In certain embodiments, the production application is housed in a dedicated production server, either as a server computer or within a virtual machine. In certain embodiments, the production application controls all other server applications and connects them together. Producers use the production application to create content. The production application handles the phase 1 compilation of sections and imports external contents like web feeds.

In certain embodiments, the production application is a stand-alone application. The application run on an individual server, communicating with the other applications, as well as the web-interface, over TCP/IP. The main responsibility of the production application is to facilitate content creation. The production application is also the central application on the server, connecting the other applications together.

Producers can create content using the web-interface to access the production application. Content is then sent to the production application. The production application handles the incoming content. All the communication (apart from between the producers and the web-interface) is done over TCP/IP socket connections. The content is sent as XML packets using the packet format. The gateway application(s) handles distribution of content to the end-users. The gateway application works as an intermediate link between the production application and the end-users, forwarding requests for content from end-users to the production application or pushing out updated content from the application to the end-user, ensuring that the content is synchronized between the server and the end-users in real-time.

The production application handles all the different kinds of content, including sections. Content is stored by the production application in the production database. In some embodiments, the production application is provided by a production server, and the production database is a component of the production server. All content items are stored in sections. In certain embodiments, sections are stored as XML files. Sections are parsed when handled by the applications. In certain embodiments, there is also some static syntax checking done on sections as they are saved. Resources are also stored in the database.

User groups are used for selective content distribution, allowing content to only be available for end-users that belong to a certain user group. The user groups that are given or denied access to content is defined as access levels for the content whose access should be controlled. Groups can be added, updated and deleted from the production application. The first phase of section compilation is also done on the server. During the first stage of compilation, high-level content is compiled and replaced by low-level content. This includes fetching web feeds and replacing them with textboxes and menus in the section, gathering quiz results, fetching and inserting articles and article lists as well as inserting headers for images and other resources into the section. The production application also handles the system user-producers, using the LDAP protocol. The system user-producers are the producers using the web-interface. Different applications are handled as projects on the production server. In certain embodiments, each project has its own project manager, and a context containing information about the system as seen by that specific project. The context contains the project's specific version of the system configuration, which can be stored as an XML file as well. The context also contains listeners for other parts of the server and managers for the resources, content items, or sections that the project can use.

User Application

The user application handles end-user registration, stores user data and synchronizes the gateways with each other. The user application also handles the sending and receiving of SMSes. The user application handles individual end-user information such as messages. In certain embodiments, the user application is run as an individual user server, communicating with the production server and the gateway server(s) over TCP/IP, as well as handling SMS communication with the end-users. The main responsibilities of the user application is to handle end-users and incoming SMSes.

The user application handles the end-users, who, in a sense, are the mobile devices that run the mobile application. New users initially connect to the entrance application, which redirects the users to a gateway application after the mobile application is downloaded and installed to the end-user device. The user application can then communicate with the end-user via the gateway application, which passes packets between the user application and the end-user. All communication is done over TCP/IP sockets, using the packet format.

Initially, end-users are identified by their phone number, but as soon as a new end-user has installed the mobile application, a new user is registered in the user application. In the system, the users are then identified by an assigned user id. The id and various other information such as registration date, registration info, last log-in time as well as optional information such as nickname, sex and birth date is stored in the database. Optional information is often gathered by an application, and can then be stored in the core database for use in other applications.

When a user connects to the system, a session can created, representing the connection. For each session, information is saved, such as ids for the session and the user, login and logout times, as well as the address the user connected from.

Users can belong to any number of user groups. The groups are used to selectively distribute content or events only to select users that belong to a certain group. User groups can be added and edited from the web-interface.

End-users can also send answers of different kinds, such as text answers, images, video files or audio files. The user application receives files and stores them in the appropriate place (for instance, files in the file system, other answers in the database). Many answer types can also be stored as resources and then be used by the application. For example, text answers can be displayed as an answer list to create a chat or comment list or photos can be saved as resources and viewed as photo albums. Users can upload files if the application needs it. The user application handles the uploading and storage of these files. Depending on if the file is an image, a video file, an audio file or some other kind of file, the user application creates appropriate folders, tables, or variables for these different kinds of files in the file system or database and stores uploaded files there.

The access level controls which user has access to what. Most objects can have an access level; content objects, articles, events and so on. The access level provides a way to allow or deny access depending on the user, group time or whatever. The access level can contain a number of access rules that are applied in ascending order.

The user service can handle sending and receiving SMSes, as well as synchronizing the gateway applications with each other. In certain embodiments, SMS handling is done using Java servlets, which can be plugged in to the server.

Entry Application

In some embodiments, the entrance application (or "entry application") handles the load balancing between the gateways and redirects the users to the gateways. The mobile application can be downloaded from the entry application.

The entrance application can allow client mobile devices to receive the mobile application. In certain embodiments, the entrance application is run as an individual server, communicating with the production application over TCP/IP, and with the end-users over HTTP. The main responsibility of the entrance application is to handle the distribution of the mobile application.

In some embodiments, the entrance application handles the distribution of the mobile application. The end-user typically will order an application by sending a registration SMS to a phone number. The device is then identified using the user agent HTTP header (this is not always possible, meaning that some users can not be identified, either because of the device or interfering systems used by the operator). When identification is possible, the entrance server registers a new user with the user application (if the user does not already exist), and generates a ticket which identifies the registration and the user. The ticket consists of a unique numerical id and a random pass phrase, which is generated. Using the ticket, a unique download URL is generated for the user, and sent back to the end-user in an SMS. By following the download link, the user can then download and install the appropriate version of the mobile application to the device.

Once the mobile application is installed, the mobile application then contacts the entrance server. The entrance server then responds with one or more addresses for gateway servers, redirecting the communication to the gateways. By controlling the addresses to the gateway servers, the entrance application can effectively balance the load on the gateways. In certain embodiments, different gateway addresses are stored in a MIDlet JAD-file, indicating which gateways are set up to handle that specific application.

Gateway Application(s)

The gateway application handle the end users, sending them the content and receiving incoming data from them. The system can contain any number of gateways, which makes it scalable to a large number of users. The gateways keep track of each connected user in a very secure and detailed way. In certain embodiments, one or more gateways are run as one or more individual servers, or within one or more virtual machines.

The gateway application sends compiled sections to mobile devices. In certain embodiments, the application is run as an individual server, communicating with the other applications over TCP/IP. The gateway can also communicate with the end-users over the appropriate protocol, which depends on the device (TCP/IP or HTTP). The main responsibility of the gateway application is to handle the connection and communication with the other server applications and the end-users.

The gateway application handles nearly all communication with the end-users, as well as communication with the production application, the user application, and the core database. Some communication with the end-users is also done by the entrance application, like distribution of the mobile application. Communication with the end-users is done over TCP/IP socket connections when possible, or alternatively over HTTP depending on the end-user device. The gateway upholds the connection to the end-users, and keeps track of all connected users.

The gateway application handles sending and receiving data to or from the end-users, ensuring that the correct user gets the correct data, and trying to eliminate any redundant data being sent to users. All communication is done as packets, using the packet format. The gateway application is scalable. Many instances of the gateway application can be run at the same time if the need arises. The user application handles synchronization between the gateways. Sections are compiled further in the gateway, producing the final XML that is sent to the end-user. The sections are compiled in two more phases here, compiling high-level objects that are user specific into low-level objects that can be displayed on the end-user device. The final, compiled XML contains no high-level objects, only low level objects that can be directly displayed as screens on the end-user device.

Web-interface

The web-interface is a standalone web-application that is used for adding and editing content. The web-interface communicates only with the production application, and is used as the interface between producers and the server. The web-interface can be accessed from anywhere using a web browser. Using the web-interface, it is possible to add, manage, delete and edit content, which in turn is organized under a specific project.

The web-interface can provide a content manager, which can be user to add new articles, quiz items or quiz schedules, as well as to view any existing content items. Since certain content such as articles can be generated automatically from feeds, the content manager provides a nice interface for viewing and editing generated articles, as well as for controlling different content categories (articles and quiz questions can optionally belong to a category). It is also possible to create and edit quiz questions in a graphical way, making it easier to create new quizzes and surveys by, for example, supplying the option of defining conditional questions. Such questions are only shown as follow-up questions, based on how a user answered a previous question.

In certain embodiments, a section manager is the main interface of the web interface for creating, editing and deleting sections. New sections can be created directly in the web-interface using a built-in editor, or imported as zip archives. In certain embodiments, every new application is created in a new project. When a section is saved, either after being added or edited, the section is sent to the production server and parsed. Parse errors are reported back to the web-interface, allowing errors to be corrected. For quizzes, it is also possible to control quiz objects from here, thereby starting, stopping and syncing quizzes.

In certain embodiments, the web interface supplies a resource manager. The resource manager allows for adding and deleting resources, as well as browsing existing resources. When new resources are added, for example by a producer, the resource file can be uploaded to the server through the web-interface. The resource's header file is also created in the web-interface and uploaded along with the actual resource file. Alternative resources can also be defined, for instance supplying images in different sizes so they will look good on displays of any size.

The web interface can also include a group manager. Through the group manager, it is possible to add, browse and delete user groups, as well as add, browse and delete users to the groups.

In certain embodiments, the web interface has a theme manager. Themes can be added, edited and deleted through the theme manager. In certain embodiments, themes are edited as XML using the built-in editor, and handled similarly to sections.

It is also possible to view many kinds of statistics using the web-interface. Data that can be provided as statistics include: basic usage statistics, such as number of users over time, user location and user activities; models of mobile devices and what technology the devices support; user submitted data, such as uploaded images, video and audio as well as text, date, choice, form and numeric answers; results of quizzes and surveys as well as top lists for quizzes; or registered users, as well as their sessions, registration tickets and SMS traffic In certain embodiments, each new application is handled as a separate project on the content creation side on a server. In the web application, a specific project is always selected, with only functionality specific to that project being shown. New projects can be created from the web interface by superusers. System users (i.e., producers) can then be given permissions that control access for the projects. In this fashion, it is possible to give system users access to only a specific project. Projects can be delineated in that only the sections, resources, themes and content for a specific project are shown once the web-interface is set to use that project. There is a default project which can be used by everyone. Super users can also edit the system configuration for projects from the web-interface.

8. Databases

In certain embodiments of the invention, data is stored using SQL databases. In certain embodiments, the only exception is a resource files, which are stored directly in the file system. In certain embodiments, there are two databases, a production database (sometimes referred to as a projects database) and a core database. In some embodiments, the production database is a construct encompassing two or more databases. In certain embodiments, the production database comprises project databases, wherein each project database corresponds to one project. Each project can use different databases (i.e., its corresponding project database) and these can be placed all on the same server or spread out to different servers. Each project can have its own configuration file.

In certain embodiments, the server has a default project that contains some information that is shared with all other projects. All MIDlets can be stored in the default project database. The core database contains data individual users, groups, end user data (phone number, nickname, user-generated data, etc.), end user session logs, and SMS logs.

The production database (used by the production application) contains content, such as configurations, sections, content items, resources, themes and so on.

9. Commands, Targets, Invocable Objects and Macros

In certain embodiments, the invention provides targets and invocable objects that run on mobile devices. In certain embodiments, the invention provides commands. Commands are similar to MIDP command objects, but offer additional functionality. In addition to the visual presentation of the command, type and priority can also be specified.

Some platforms don't include commands as a native feature, so the invention provides its own commands to run on platforms such as these.

When activated, a command can invoke a target, which is either an invocable content object, or a macro describing some special action.

If the target is the id of an invocable object, the object is invoked and the appropriate action is taken. In certain embodiments, the action could include displaying a displayable object on screen, playing an audio or video clip, uploading a photo, or sending an SMS.

An invocable object is an object that can be invoked. Each invocable object contains information on how it can be invoked, which can be uniquely identified. User interaction in client applications is enabled by invocable commands attached to displayable objects displayed on the mobile device screen. Commands can also be attached to non-displayable objects such as menu items and item objects. Depending on the mobile device, user interactions are performed in different ways. For example, some devices use touchscreens as input devices, other devices use buttons. End user interaction can be tailored to different mobile devices.

Command objects do not by themselves contain information about their targets. This information is specified in the displayable (object) associated with the command. Commands can be included in menus, command bars, or mapped directly onto buttons.

When defining commands in a section, commands are allocated priorities, allowing the client application to gauge their relative importance. Commands are sometimes handled differently on different mobile devices, so the look and feel of a client application can vary somewhat, and end user interaction can be tailored for each device.

Active commands are associated with displayable objects currently on-screen. Any number of commands can be active at the same time.

Invocable Objects include displayable objects, input objects, quiz/survey objects, composite targets, and platform requests. Displayable object refers to a content object that can be displayed on a mobile device as either a screen or a canvas, and can generate a command for user input. An input is an object generated via end user input, such as text, image, or an audio clip. Quizzes and surveys are special content objects containing questions for quiz-type games, statistics gathering or market research. A composite target allows multiple actions to be performed by a single command. A platform request invokes platform requests, which could include, for example, opening a web browser.

In some embodiments, the invention provides macros. A macro is used to describe hardware functions or internal logic on a device, and can be invoked by commands.

If the target is a macro, the macro is executed. This could, for example, flash the backlight or cause vibrating, returning to the previous displayable object (logical back), or similar. Macros are an abstraction layer to native mobile functions.

The use of macros allows single sections and contexts to be used across a wide range of mobile devices, though the actual handling of macro commands is performed separately on each device.

Macros are used for hardware-related commands such as controlling screens and navigation, GPS, connectivity, audio, backlights, vibration and memory; as well as for some logical functions. For example, "run target" could be a macro that executes a target in a separate thread on the client application. This is useful for executing functions that might lock up the device or similar.

Incorporation by Reference

Systems, methods, and devices of the invention are also described in U.S. patent application Ser. No. 13/269,211, filed Oct. 7, 2011, and also claiming priority to U.S. Provisional 61/391,272, filed Oct. 8, 2010, by the same inventors and titled SCALABLE SYNCHRONIZATION OF EVENTS AMONG SERVER AND CLIENTS WITH VARYING LAG-TIMES, which is herein incorporated by reference in its entirety.

Systems, methods, and devices of the invention are also described in U.S. patent application Ser. No. 13/269,269, filed Oct. 7, 2011, under Attorney Docket Number: 29090/9 and also claiming priority to U.S. Provisional 61/391,272, filed Oct. 8, 2010, by the same inventors and titled DISTRIBUTION OF CONTENT AND BEHAVIOR TO DISPARATE PLATFORMS, which is herein incorporated by reference in its entirety.

Equivalents

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

EXAMPLES

Example 1

Quiz

In certain illustrative embodiments, the invention provides tools for conducting a quiz. Quizzes requires compilation in all three phases. This example shows how a simple quiz with two questions is compiled, starting with the "source" section—i.e. the section entered via the web-interface

```
<section id="1" name="Quiz" main="menu1" next_id="7">
<command id="select_cmd" label="Select" type="OK" priority="0"/>
<command id="ok_cmd" label="OK" type="OK" priority="0"/>
<command id="back_cmd" label="Back" type="BACK" priority="0"/>
<command id="answer_cmd" label="Answer" type="OK" priority="0"/>
<command id="exit_cmd" label="Exit" type="EXIT" priority="0"/>
<menu id="menu1" default_cmd="select_cmd" title="">
<cmd id="select_cmd" target="___select"/>
<menuitem id="menuitem1" label="Play" target="textbox"/>
</menu>
<quiz id="quiz1" name="Quiz Object" schedule="1" answer_cmd="select_cmd" end_target="___back"/>
<textbox id="textbox" title="" text="Wait for questions.">
<cmd id="back_cmd" target="___close"/>
```

```
</textbox>
<compositetarget id="compositetarget5" label="Back and to game screen">
<invoke target="___back"/>
<invoke target="textbox"/>
</compositetarget>
<compositetarget id="auto_ctarget50" label="___answer and ___back" auto_generated="true">
<invoke target="___answer"/>
<invoke target="___back"/>
</compositetarget>
<header>
<sectionheader id="1" name="Quiz" alias="7" num_id="1"/>
</header>
</section>
```

The section contains 3 content items: the quiz schedule and 2 quiz questions.

```
<schedule round="1" timed="false" id="1" name="test" start_publish="07.05.2010 10:32:00" stop_publish=
"14.11.2012 14:29:35">
    <event id="2" timecode="00:00:00" answer_time="00:00:09" wait_for_correction_time="00:00:01"
    show_correction_time="00:00:00"/>
    <event id="3" timecode="00:00:01" answer_time="00:00:12" wait_for_correction_time="00:00:01"
    show_correction_time="00:00:00"/>
</schedule>
\\
<quizitem type="choice" has_help="66" id="2" name="Question 1" start_publish="01.01.1970
02:00:00"
    stop_publish="01.01.1970 02:00:00" mode="ONE_CORRECT">
    <alternative id="1" text="Alternative 1" points="1.000000"/>
    <alternative id="2" text="Alternative 2" points="0.000000"/>
    <alternative id="3" text="Alternative 3" points="0.000000"/>
</quizitem>
\\
<quizitem type="choice" has_help="66" id="3" name="Question 2" start_publish="01.01.1970
02:00:00"
    stop_publish="01.01.1970 02:00:00" mode="ONE_CORRECT">
    <alternative id="1" text="A" points="0.000000"/>
    <alternative id="2" text="B" points="1.000000"/>
    <alternative id="3" text="C" points="0.000000"/>
</quizitem>
```

After Phase 1, compilation and parsing may cause section elements to be reordered, and nested elements (e.g. menu items) may be parsed into separate XML elements, and/or lose their nesting entirely. However, these are generally cosmetic changes. The primary compilation effect is to the quiz itself, as the schedule and quiz question content items are inserted into the section contained in the quiz data XML element. The schedule and questions content will remain unchanged, though some attributes may have reordered (due to parsing).

Phase 1 compilation of the above quiz example produces the resulting XML data:

```
<section id="1" main="menu1" style="" theme="">
<header>
<sectionheader id="1" name="Quiz" alias="7" num_id="1"/>
</header>
<command id="answer_cmd" label="Answer" type="OK" priority="0"></command>
<compositetarget id="auto_ctarget50">
<invoke target="___answer"/>
<invoke target="___back"/>
</compositetarget>
<command id="back_cmd" label="Back" type="BACK" priority="0"></command>
<compositetarget id="compositetarget5">
<invoke target="___back"/>
<invoke target="textbox"/>
</compositetarget>
<command id="exit_cmd" label="Exit" type="EXIT" priority="0"></command>
<menu id="menu1" default_cmd="select_cmd" title="" select_cmd="select_cmd">
<cmd id="select_cmd" target="___select"/>
<item id="menu1.menuitem1" target="textbox"/>
</menu>
<menuitem id="menu1.menuitem1" label="Play" icon="" text=""></menuitem>
<command id="ok_cmd" label="OK" type="OK" priority="0"></command>
```

```
<quiz id="quiz1" name="Quiz Object" category= 1 select_cmd" end_target="
"" schedule=" " answer_cmd="
___back" help_cmd="" help_target="" hide_cmd="" hide_target=" ___back" close_cmd=""
close target=" ___close
" answer_once="false" empty_target="" use_hide_targets=" false" change_answer="false"
client_side="
    false">
    <quizdata>
    <schedule id="1" name="test" start_publish="07.05.2010 10:32:00" stop_publish="14.11.2012
14:29:35"
    folder="0" type="schedule" "false" style="" default_cmd="" timed=" false 1
    has_help=" round=" "
    advance_time="45000">
    <event id="2" timecode="00:00:00.000" answer_time="00:00:09.000" wait_for_correction_time=
    "00:00:01.000" show_correction_time="00:00:00.000">
    <quizitem id="2" name="Question 1" start_publish="01.01.1970 02:00:00" stop_publish="01.01.1970
    02:00:00" folder="0" type="choice" has_help="false" style="" default_cmd="" mode="
ONE_CORRECT"
    max_select="1">
    <alternative id="1" text="Alternative 1" points="1.000000"/>
    <alternative id="2" text="Alternative 2" points="0.000000"/>
    <alternative id="3" text="Alternative 3" points="0.000000"/>
    </quizitem>
    </event>
    <eventid="3"timecode="00:00:01.000" answer_time="00:00:12.000" wait_for_correction_time=
    "00:00:01.000" show_correction_time="00:00:00.000">
    <quizitem id="3" name="Question 2" start_publish="01.01.1970 02:00:00" stop_publish="01.01.1970
    02:00:00" folder="0" type="choice" has_help="false" style="" default_cmd="" mode="
ONE_CORRECT"
    max_select="1">
    <alternative id="1" text="A" points="0.000000"/>
    <alternative id="2" text="B" points="1.000000"/>
    <alternative id="3" text="C" points="0.000000"/>
    </quizitem>
    </event>
    </schedule>
    </quizdata>
    </quiz>
    <command id="select_cmd" label="Select" type="OK" priority="0"></command>
    <textbox id="textbox" default_cmd="" title="" text=" Wait for questions.">
    <cmd id="back_cmd" target="___close"/>
    </textbox>
    </section>
```

After Phase 2 compilation, the quiz data XML elements remain, and choice input objects have been auto-generated to represent the questions in the compiled quiz. As both content items and quiz objects are high-level objects, low-level auto-generated choice input objects are needed to run on the mobile application.

Phase 2 compilation of the above quiz example produces the resulting XML data:

```
<section id="1" main="menu1" style="" theme="">
<header>
<sectionheader id="1"name="Quiz" alias="7" num_id="1"/>
</header>
<command id="answer_cmd" label="Answer" type="OK" priority="0">
</command>
<compositetarget id="auto_ctarget50">
<invoke target="___answer"/>
<invoke target="___back"/>
</compositetarget>
<command id="back_cmd" label="Back" type="BACK" priority="0">
</command>
<compositetarget id="compositetarget5">
<invoke target="___back"/>
<invoke target="textbox"/>
</compositetarget>
<command id="exit_cmd" label="Exit" type="EXIT" priority="0">
</command>
<menu id="menu1" default_cmd="select_cmd" title="" select_cmd="select_cmd">
<cmd id="select_cmd" target="___select"/>
<item id="menu1.menuitem1" target="textbox"/>
</menu>
<menuitem id="menu1.menuitem1" label="Play" icon="" text="">
</menuitem>
<command id="ok_cmd" label="OK" type="OK" priority="0">
</command>
```

-continued

```
<quiz id="quiz1" name="Quiz Object" category= 1 select_cmd" end_target="
"" schedule=" " answer_cmd="
___back" help_cmd="" help_target="" hide_cmd="" hide_target=" ___back" close_cmd=""
close_target=" ___close
" answer_once="false" empty_target="" use_hide_targets=" false" change_answer="false"
client_side="
    false">
    <quizdata>
    <schedule id="1" name="test" start_publish="07.05.2010 10:32:00" stop_publish="14.11.2012
14:29:35"
        folder="0" type="schedule" "false" style="" default_cmd="" timed=" false 1
        has_help=" round=" "
        advance_time="45000">
        <event id="2" timecode="00:00:00.000" answer_time="00:00:09.000" wait_for_correction_time=
        "00:00:01.000" show_correction_time="00:00:00.000">
        <quizitem id="2" name="Question 1" start_publish="01.01.1970 02:00:00" stop_publish="01.01.1970
02:00:00" folder="0" type="choice" has_help="false" style="" default_cmd="" mode="
ONE_CORRECT"
        max_select="1">
        <alternative id="1" text="Alternative 1" points="1.000000"/>
        <alternative id="2" text="Alternative 2" points="0.000000"/>
        <alternative id="3" text="Alternative 3" points="0.000000"/>
        </quizitem>
        </event>
        <eventid="3"timecode="00:00:01.000" answer_time="00:00:12.000" wait_for_correction_time=
        "00:00:01.000" show_correction_time="00:00:00.000">
        <quizitem id="3" name="Question 2" start_publish="01.01.1970 02:00:00" stop_publish="01.01.1970
02:00:00" folder="0" type="choice" has_help="false" style="" default_cmd="" mode="
ONE_CORRECT"
        max_select="1">
        <alternative id="1" text="A" points="0.000000"/>
        <alternative id="2" text="B" points="1.000000"/>
        <alternative id="3" text="C" points="0.000000"/>
        </quizitem>
        </event>
        </schedule>
    </quizdata>
    </quiz>
    <choiceinput id="quiz1.2" default_cmd="select_cmd" initial_value="" answer_macro="
___redirect(___schedule(1,1),2)" answer_rule="ADD" label="Question 1">
    <accesslevel/>
    <cmd id="select_cmd" target="quiz1.ans2"/>
    <item id="1" label="Alternative 1" selected="false" icon="" style="" text=" ">
    </item>
    <item id="2" label="Alternative 2" selected="false" icon="" style="" text=" ">
    </item>
    <item id="3" label="Alternative 3" selected="false" icon="" style="" text=" ">
    </item>
    </choiceinput>
    <choiceinput id="quiz1.3" default_cmd="select_cmd" initial_value="" answer_macro="
___redirect(___schedule(1,1),3)" answer_rule="ADD" label="Question 2">
    <accesslevel/>
    <cmd id="select_cmd" target="quiz1.ans3"/>
    <item id="1" label="A" selected="false" icon="" style="" text=" ">
    </item>
    <item id="2" label="B" selected="false" icon="" style="" text=" ">
    </item>
    <item id="3" label="C" selected="false" icon="" style="" text=" ">
    </item>
    </choiceinput>
    <command id="select_cmd" label="Select" type="OK" priority="0">
    </command>
    <textbox id="textbox" default_cmd="" title="" text=" Wait for questions.">
    <cmd id="back_cmd" target="___close"/>
    </textbox>
    </section>
```

Phase 3 compilation is performed on individual packets before they are delivered to the client.

In the example below, an empty section is sent to the client. Section information has already been sent to the client and has not changed since, so no packets are sent containing information about section id, header and so on. Additionally, as everything else was added at the same time, each of the XML elements below are sent as separate packets. If only one XML element had been changed, only the relevant packet is compiled and sent to the client. A single XML element in this case can be a command, a menu, a menu item, a choice input, etc.

The major effect of Phase 3 compilation as shown in the example here, is the removal of the actual quiz object.

Quiz objects and content items are high-level objects that can not be read by the client. In the Phase 2 compilation step, choice inputs were already generated to act as quiz questions on the client. Therefore, quiz objects are no longer needed and are removed in Phase 3. Additionally, in order to enable end user input, a set of composite targets is automatically generated (composite targets are commands specifying how an end user's answers are handled and uploaded to the server).

Phase 3 compilation of the above quiz example produces the resulting XML data:

```
<clientdata>
<command id="answer_cmd" label="Answer" type="OK" priority="0">
</command>
<compositetarget id="auto_ctarget50">
<invoke target="___answer"/>
<invoke target="___back"/>
</compositetarget>
<command id="back_cmd" label="Back" type="BACK" priority="0">
</command>
<compositetarget id="compositetarget5">
<invoke target="___back"/>
<invoke target="textbox"/>
</compositetarget>
<command id="exit_cmd" label="Exit" type="EXIT" priority="0">
</command>
<menu id="menu1" default_cmd="select_cmd" title="" select_cmd="select_cmd">
<cmd id="select_cmd" target="___select"/>
<item id="menu1.menuitem1" target="textbox"/>
</menu>
<menuitem id="menu1.menuitem1" label="Play" icon="" text="">
</menuitem>
<command id="ok_cmd" label="OK" type="OK" priority="0">
</command>
<compositetarget id="quiz1.ans2">
<accesslevel/>
<invoke target="___answer"/>
<invoke target="___back"/>
<invoke target="quiz1.3"/>
</compositetarget>
<compositetarget id="quiz1.ans3">
<accesslevel/>
<invoke target="___answer"/>
<invoke target="___msg(___counterhit(2))"/>
<invoke target="___back"/>
</compositetarget>
<compositetarget id="quiz1">
<accesslevel/>
<invoke target="quiz1.2"/>
<invoke target="___msg(___counterhit(1))"/>
</compositetarget>
<choiceinput id="quiz1.2" default_cmd="select_cmd" initial_value="" answer_macro="
___redirect(___schedule(1,1),2)" answer_rule="ADD" label="Question 1">
<accesslevel/>
<cmd id="select_cmd" target="quiz1.ans2"/>
<item id="1" label="Alternative 1" selected="false" icon="" style="" text=" ">
</item>
<item id="2" label="Alternative 2" selected="false" icon="" style="" text=" ">
</item>
<item id="3" label="Alternative 3" selected="false" icon="" style="" text=" ">
</item>
</choiceinput>
<choiceinput id="quiz1.3" default_cmd="select_cmd" initial_value="" answer_macro="
___redirect(___schedule(1,1),3)" answer_rule="ADD" label="Question 2">
<accesslevel/>
<cmd id="select_cmd" target="quiz1.ans3"/>
<item id="1" label="A" selected="false" icon="" style="" text=" ">
</item>
<item id="2" label="B" selected="false" icon="" style="" text=" ">
</item>
<item id="3" label="C" selected="false" icon="" style="" text=" ">
</item>
</choiceinput>
<command id="select_cmd" label="Select" type="OK" priority="0">
</command>
<textbox id="textbox" default_cmd="" title="" text=" Wait for questions.">
<cmd id="back_cmd" target="___close"/>
</textbox>
</clientdata>
```

Example 2

Translations

Content display can also be managed via end user settings and/or options. For example, an app might offer the end user a choice of languages, using what are termed "translations". Translations can be used to change labels (e.g. the above language example) as well as content objects, and are added immediately prior to content being sent to the mobile application (after Phase 3 compilation). Selection of which translation option to be performed can either be managed via end user input (i.e. whereby a translation is selected from a list), or automatically, by matching a value uploaded from the mobile device (i.e. what kind of platform is the client running on, client display size, etc.).

Information related to section translation is stored in the section head. Translations comprise a translation selection, which identifies the translation to be used, plus the corresponding translations. A translation contains an id, and a set of "translate" elements. A translate element defines both the id of the object to be translated, and what will be translated. Content objects contain rules about what can be translated and how it can be done. The most common are label translations (which is possible for most types of object), and adding/removing commands on displayable objects. A single section can define several translations.

For example:

```
<translationselect input="langselect">
<ans id="1" translation="pt"/>
</translationselect>
translation id="pt">
translate id="sel_cmd" label="Selecionar"/>
<translate id="continue_cmd" label="Continuar"/>
<translate id="styletexts">
<attribute name="cmd-more-item-txt" value="Opções"/>
</translate>
</translation>
```

In the above example, the end user can set the language of the application to Portuguese by selecting the answer with id 1 from an input called "langselect" (the second option of a choice input called langselect). The translate items change the labels of two commands, as well as the value of an attribute in a style class. Normally, labels are in English but if Portuguese is chosen by the user, the labels are translated prior to content being sent—apart from this, the application remains exactly the same.

What is claimed is:

1. A system for managing content, the system comprising:
a production server coupled to a web interface and configured to allow, via the web interface, a producer to create a source section comprising content;
a gateway server comprising a memory, a processor, and an input device, in communication with the production server, and configured to receive, responsive to a request from a client, the source section, and wherein the processor is configured to:
save the source section to the memory;
read, responsive to a request from a subsequent client for content previously accessed by any client, the source section;
write, responsive to the request from the subsequent client, a dynamic section comprising the content;
compile the dynamic section into a compiled section comprising the content; and
send the compiled section to a first client queue; and
a mobile device configured to:
establish a socket connection to the gateway server;
register as a listener with the gateway server; and
receive the compiled section.

2. The system of claim 1 further comprising a core database comprising a group data item, a first individual data item, and a second individual data item, and further wherein the processor is configured to:
read the source section and the group data item;
write the dynamic section to comprise the content and the group data item; and
compile the dynamic section and the first individual data item into the compiled section; and
compile the dynamic section and the second individual data item into a second compiled section distinct from the compiled section,
and further wherein the compiled section consists of a plurality of binary packets, the plurality of binary packets comprising the content, the group data item, and the first individual data item and the second compiled section consists of a second plurality of binary packets, the second plurality of binary packets comprising the content, the group data item, and the second individual data item.

3. An apparatus for delivering content to one or more clients, the apparatus comprising:
a memory;
an input device in communication with the memory and configured to receive a source section comprising a content;
a core database, the core database comprising a group data item, a second group data item received from a production computer where the second group data item was created by a producer, an individual data item received from a mobile device with an operating system, and a second individual data item received from a second mobile device with a second operating system different from the operating system; and
a processor in communication with the input device and the memory and configured to:
save the source section in the memory;
read the source section and the group data item;
write a dynamic section comprising the content and the group data item;
compile the dynamic section and the individual data item into a compiled section comprising the content;
send the compiled section to a client queue;
write a second dynamic section comprising the content and the second group data item;
compile the second dynamic section and the individual data item into a replacement compiled section recognizable by the operating system on the mobile device;
compile the second dynamic section and the second individual data item into a second compiled section recognizable by the second operating system on the second mobile device;
compile the dynamic section and the second individual data item into a shared compiled section recognizable by the operating system and the second operating system; and
compile the second dynamic section into a group compiled section recognizable by the first operating system and the second operating system.

4. The apparatus of claim 3, wherein the compiled section comprises a content app executable by a mobile application on the first mobile device; and
the second compiled section comprises a second content app executable by a second mobile application on the second mobile device.

5. The apparatus of claim 3 further wherein the compiled section consists of a plurality of binary packets, and the plurality of binary packets comprises the content.

6. The apparatus of claim 3 wherein the input device receives the source section responsive to a phase one initiating event selected from the list consisting of: a first logon onto the system; a request from the first client for content previously not accessed by any client; a feed manager retrieves new content; a producer produces new content; a scheduled event transpires; and a producer pushes content.

7. The apparatus of claim 3, wherein the processer reads the source section and writes the dynamic section responsive to a phase two initiating event selected from the list consisting of: the receiving by the memory of the source section comprising the content; a logon by a subsequent client; and a request from a subsequent client for content previously accessed by any client.

8. The apparatus of claim 3, wherein the processor is further configured to:

compare the source section to an older source section corresponding to the source section and write, responsive to the source section being not the same as the older source section, the dynamic section and compile the dynamic section into a compiled section and send the compiled section to the client queue; and compare the dynamic section to an older dynamic section corresponding to the dynamic section and compile, responsive to the dynamic section not being the same as the older dynamic section, the dynamic section into a compiled section and send the compiled section to the client queue.

* * * * *